(12) United States Patent
Marcouiller et al.

(10) Patent No.: US 8,090,234 B2
(45) Date of Patent: Jan. 3, 2012

(54) CABLE ANCHORING DEVICE

(75) Inventors: Thomas Marcouiller, Shakopee, MN (US); Kenneth Christopher Nardone, North Bennington, VT (US); Chad James Sjodin, Savage, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 12 days.

(21) Appl. No.: 12/423,541

(22) Filed: Apr. 14, 2009

(65) Prior Publication Data

US 2009/0317046 A1    Dec. 24, 2009

Related U.S. Application Data

(60) Provisional application No. 61/046,650, filed on Apr. 21, 2008, provisional application No. 61/058,624, filed on Jun. 4, 2008, provisional application No. 61/168,459, filed on Apr. 10, 2009.

(51) Int. Cl.
 *G02B 6/00* (2006.01)
(52) U.S. Cl. .................................. 385/136; 385/134
(58) Field of Classification Search .................. 385/134, 385/136
 See application file for complete search history.

(56) References Cited

U.S. PATENT DOCUMENTS

| | | | | |
|---|---|---|---|---|
| 5,127,082 A * | 6/1992 | Below et al. | ................. | 385/135 |
| 5,548,678 A * | 8/1996 | Frost et al. | ................. | 385/135 |
| 6,311,007 B1 * | 10/2001 | Daoud | .................. | 385/135 |
| 6,484,958 B1 * | 11/2002 | Xue et al. | ................. | 242/378.1 |
| 6,487,357 B1 * | 11/2002 | Daoud et al. | ................. | 385/135 |
| 6,580,866 B2 * | 6/2003 | Daoud et al. | ................. | 385/135 |
| 6,625,374 B2 * | 9/2003 | Holman et al. | .............. | 385/135 |
| 6,741,784 B1 | 5/2004 | Guan | | |
| 6,873,778 B2 * | 3/2005 | Tsai et al. | .................... | 385/135 |
| 6,915,058 B2 * | 7/2005 | Pons | .............................. | 385/135 |
| 7,116,883 B2 * | 10/2006 | Kline et al. | ................... | 385/135 |
| 7,229,042 B2 * | 6/2007 | Thebault et al. | ........... | 242/388.1 |
| 7,315,681 B2 * | 1/2008 | Kewitsch | ....................... | 385/135 |
| 7,680,386 B2 * | 3/2010 | Hurley | ......................... | 385/135 |
| 2005/0226588 A1 * | 10/2005 | Pons | ............................. | 385/135 |
| 2006/0045458 A1 * | 3/2006 | Sasaki et al. | .................. | 385/135 |
| 2006/0093307 A1 * | 5/2006 | Lowentat et al. | ............ | 385/147 |
| 2007/0031101 A1 * | 2/2007 | Kline et al. | .................... | 385/135 |
| 2007/0036506 A1 * | 2/2007 | Kewitsch | ....................... | 385/135 |
| 2009/0202214 A1 * | 8/2009 | Holmberg et al. | ............ | 385/135 |

FOREIGN PATENT DOCUMENTS

| | | |
|---|---|---|
| EP | 0 084 440 A2 | 7/1983 |
| EP | 0 253 728 A1 | 1/1988 |
| EP | 0 712 018 A1 | 5/1996 |
| FR | 2 769 377 A1 | 4/1999 |
| JP | 2003-262742 | 9/2003 |
| JP | 2004-184759 | 7/2004 |

OTHER PUBLICATIONS

Invitation to Pay Additional Fees with Partial International Search mailed Jul. 1, 2009.
International Search Report and Written Opinion mailed Oct. 19, 2009.

* cited by examiner

*Primary Examiner* — Rhonda Peace
(74) *Attorney, Agent, or Firm* — Merchant & Gould P.C.

(57) ABSTRACT

The present disclosure relates to a cable anchoring device for anchoring a fiber optic cable to a building, wall, pole or other structure. The cable anchoring device includes a spool component about which the fiber optic cable is wrapped at least two times. The cable anchoring device also includes a clamping component that cooperates with the spool component to anchor the cable.

24 Claims, 27 Drawing Sheets

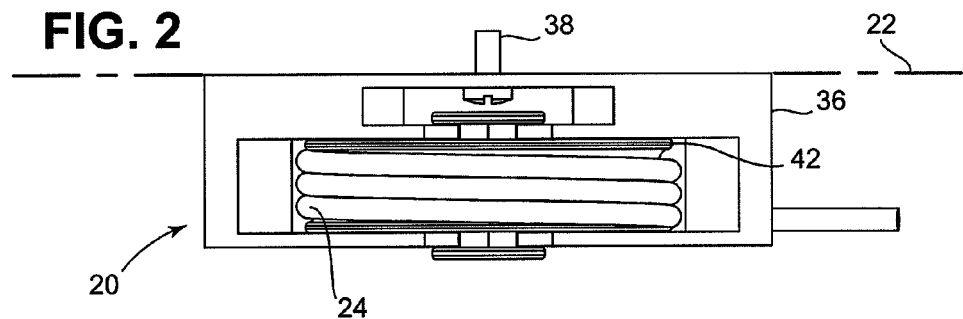
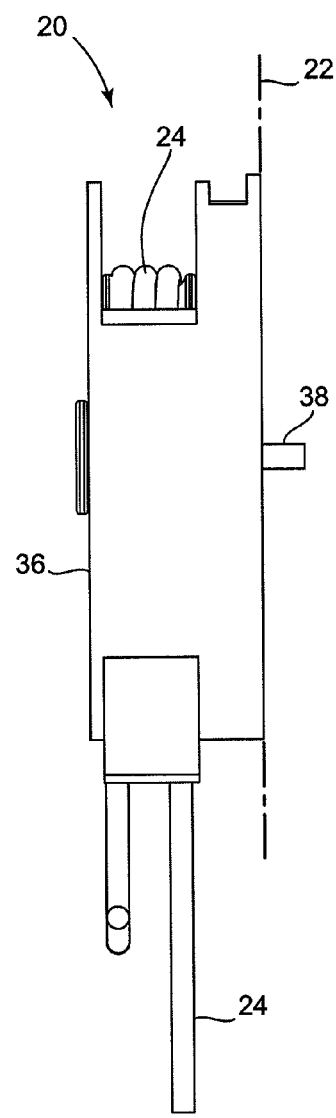

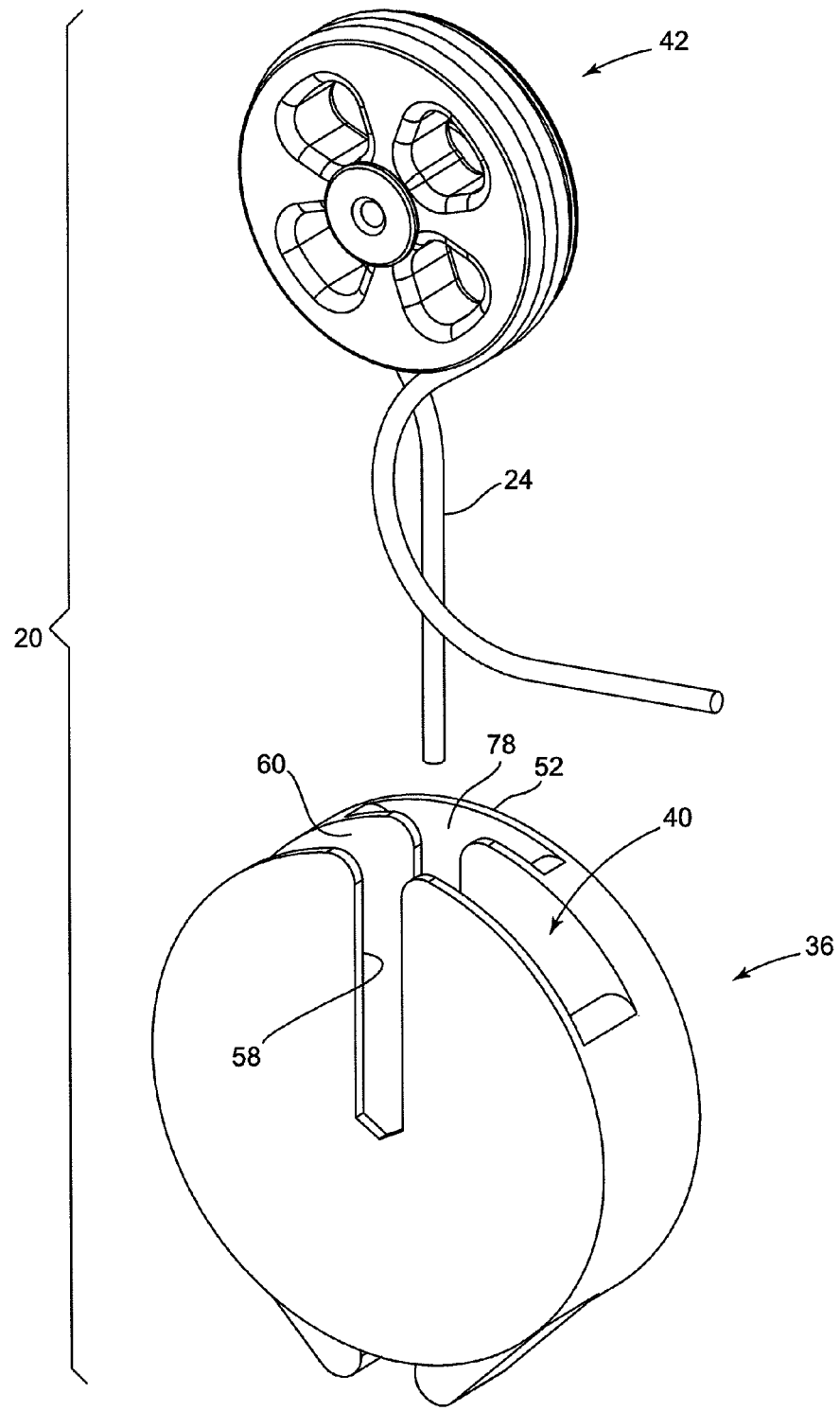

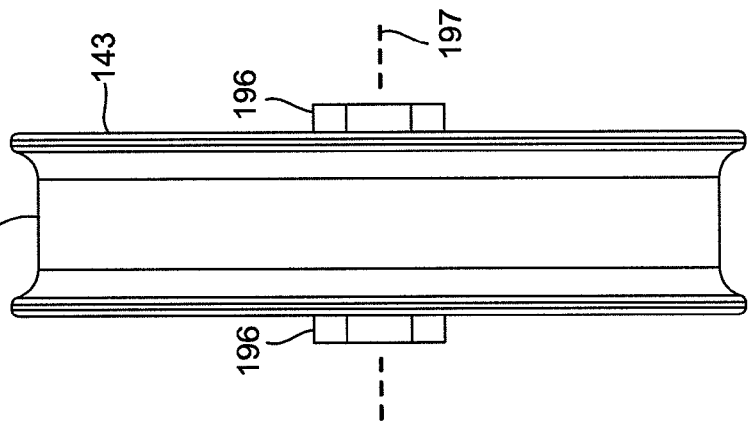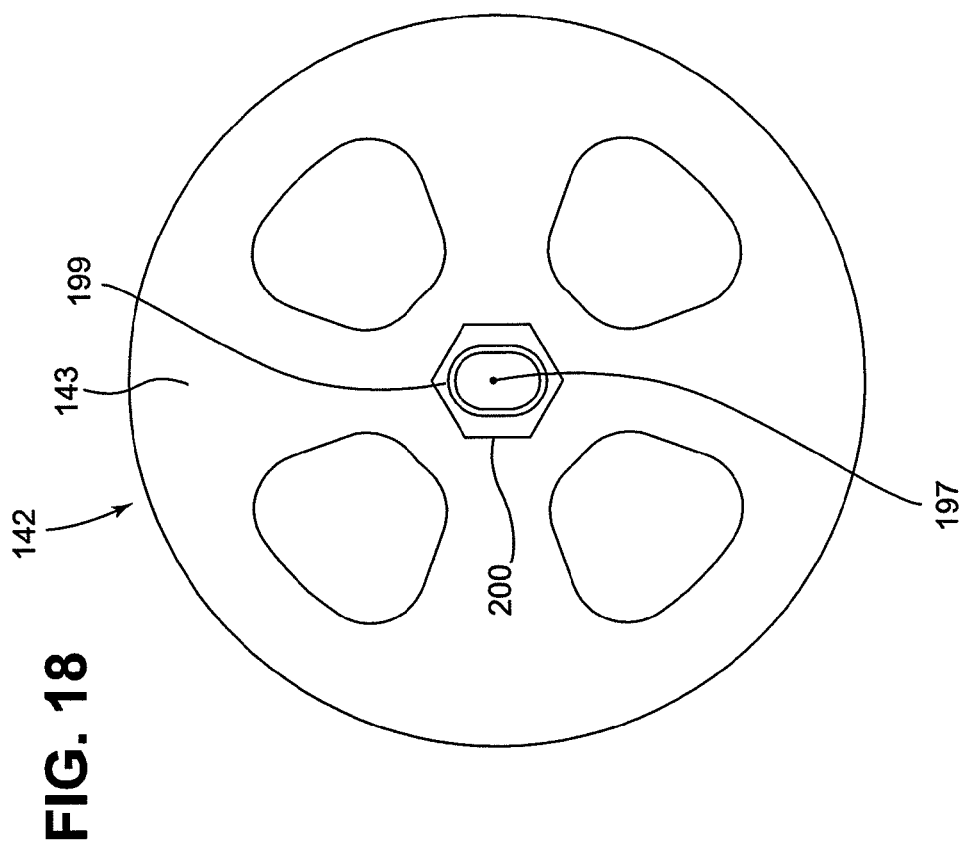

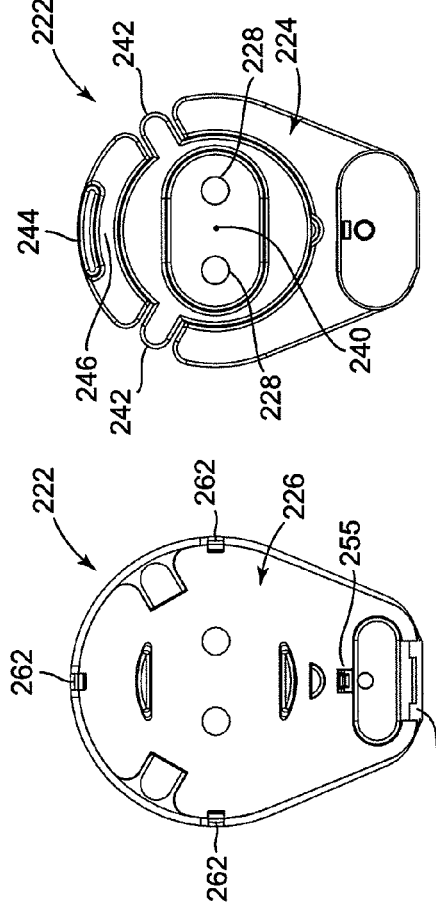
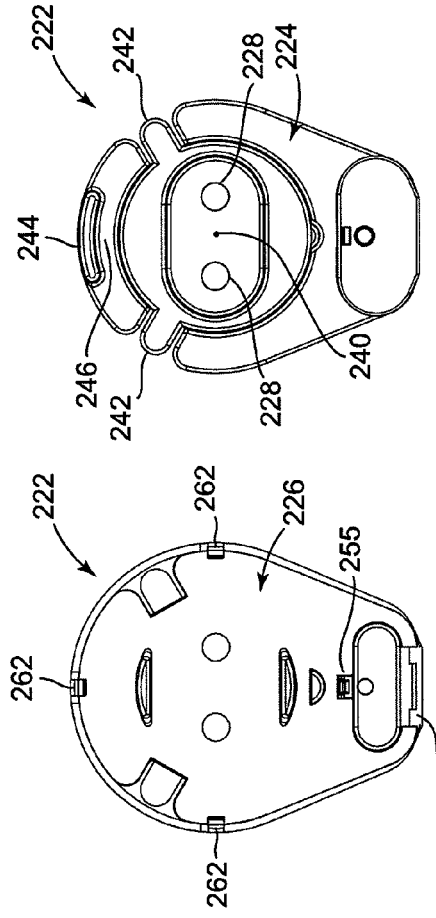
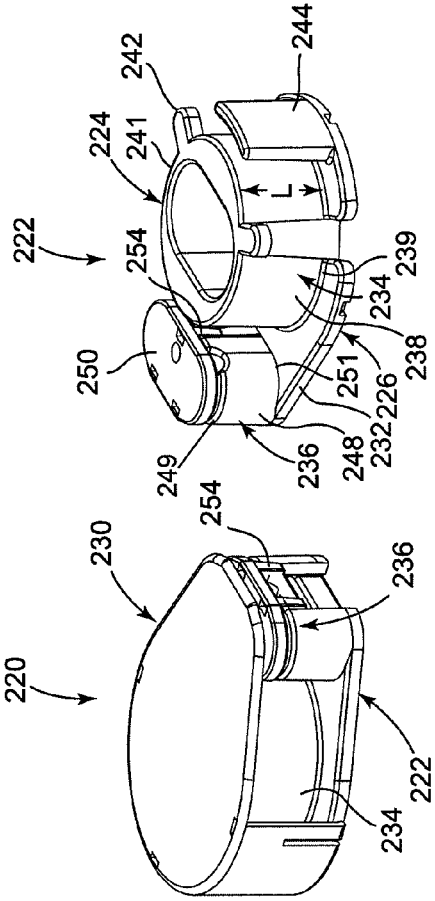
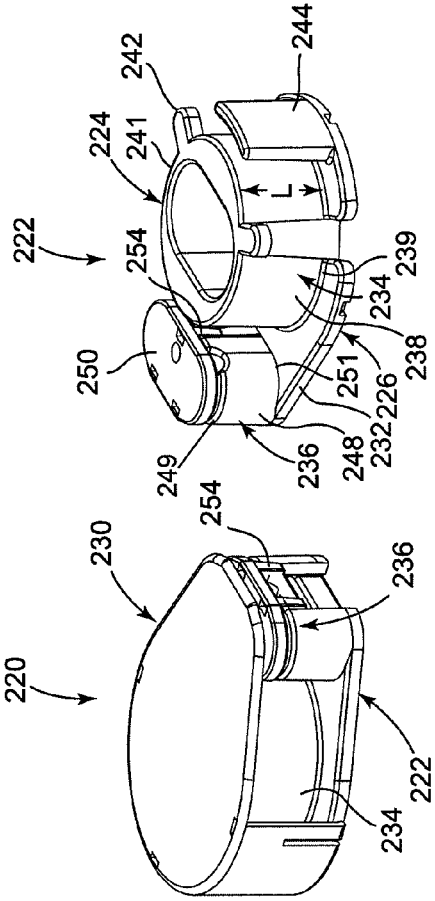
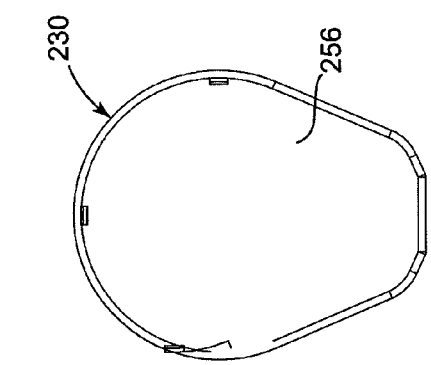
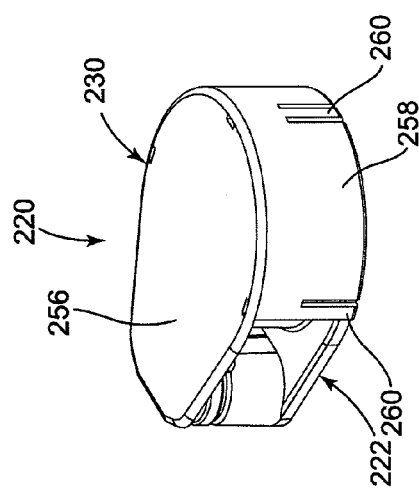

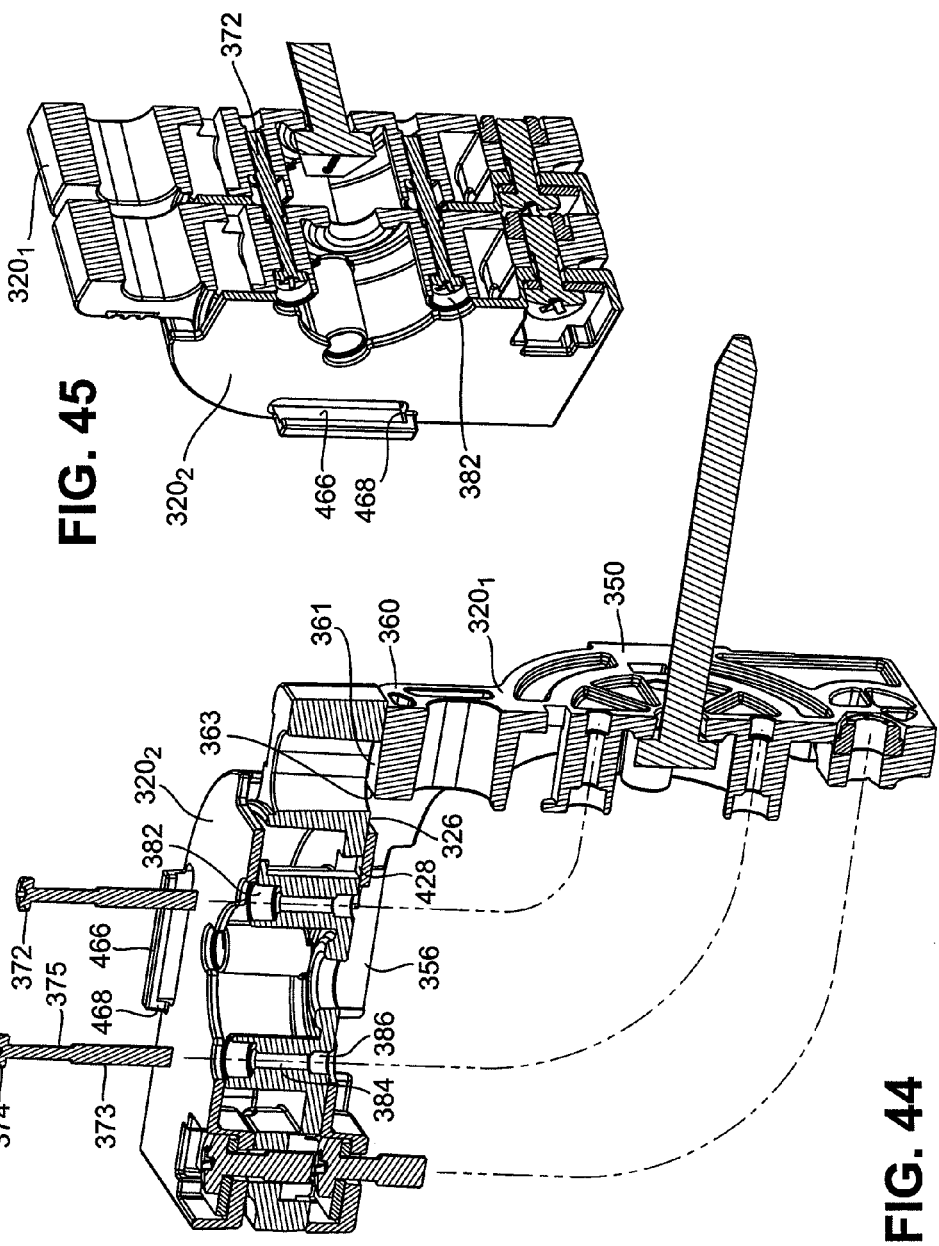

CABLE ANCHORING DEVICE

CROSS REFERENCE TO RELATED APPLICATIONS

This application claims the benefit of U.S. Provisional Patent Application Ser. No. 61/046,650, filed Apr. 21, 2008; U.S. Provisional Patent Application Ser. No. 61/058,624, filed Jun. 4, 2008; and U.S. Provisional Patent Application Ser. No. 61/168,459, filed Apr. 10, 2009, which applications are incorporated herein by reference in their entirety.

BACKGROUND

Fiber optic telecommunications technology is becoming more prevalent as service providers strive to deliver higher bandwidth communication capabilities to customers/subscribers. The phrase "fiber to the x" (FTTX) generically refers to any network architecture that uses optical fiber in place of copper within a local distribution area. Example FTTX networks include fiber-to-the-node (FTTN) networks, fiber-to-the-curb (FTTC) networks and fiber-to-the-premises (FTTP) networks.

FTTN and FTTC networks use fiber optic cables that are run from a service provider's central office to a cabinet serving a neighborhood. Subscribers connect to the cabinet using traditional copper cable technology such as coaxial cable or twisted pair wiring. The difference between an FTTN network and an FTTC network relates to the area served by the cabinet. Typically, FTTC networks typically have cabinets closer to the subscribers that serve a smaller subscriber area than the cabinets of FTTN networks.

In an FTTP network, fiber optic cables are run from a service provider's central office all the way to the subscriber's premises. Example FTTP networks include fiber-to-the-home (FTTH) networks and fiber-to-the-building (FTTB) networks. In an FTTB network, optical fiber is routed from the central office over an optical distribution network to an optical network terminal (ONT) located in a building. The ONT typically includes active components that convert the optical signals into electrical signals. The electrical signals are typically routed from the ONT to the subscriber's residence or office space using traditional copper cable technology. In an FTTH network, fiber optic cable is run from the service provider's central office to an ONT located at the subscriber's residence or office space. Once again, at the ONT, optical signals are typically converted into an electrical signal for use with the subscriber's devices. However, to the extent that an end user may have devices that are compatible with optical signals, conversion of the optical signal to an electrical signal may not be necessary.

FTTP networks include active optical networks and passive optical networks. Active optical networks use electrically powered equipment (e.g., a switch, router, multiplexer or other equipment) to distribute signals and to provide signal buffering. Passive optical networks use passive beam splitters instead of electrically powered equipment to split optical signals. In a passive optical network, ONT's are typically equipped with equipment (e.g., wave-division multiplexing and time-division multiplexing equipment) that prevents incoming and outgoing signals from colliding and that filters out signals intended for other subscribers.

A typical passive FTTP network includes fiber optic cables routed from a central location (e.g., a service provider's central office) to a fiber distribution hub located in a local area such as a neighborhood. The fiber distribution hub typically includes a cabinet in which one or more passive optical splitters are mounted. The splitters each are capable of splitting a signal carried by a single fiber to a plurality of fibers. The fibers split out at the splitter are routed from the fiber distribution hub into the local area using a fiber optic distribution cable. Fibers are routed from the fiber distribution cable to subscriber locations (e.g., homes, businesses or buildings) using various techniques. For example, fiber optic drop cables can be routed directly from a breakout location on the distribution cable to an ONT at a subscriber location. Alternatively, a stub cable can be routed from a breakout location of the distribution cable to a drop terminal. Drop cables can be run from the drop terminal to ONT's located at a plurality of premises located near the drop terminal.

SUMMARY

Features of the present disclosure relate to anchoring devices suitable for anchoring fiber optic cables to buildings, walls, poles or other structures.

These and other features and advantages will be apparent from a reading of the following detailed description and a review of the associated drawings. It is to be understood that both the forgoing general description and the following detailed description are explanatory only and are not restrictive of the broad aspects of the disclosure.

BRIEF DESCRIPTION OF THE DRAWINGS

FIG. 2 is a top view of the cable clamp of FIG. 1;

FIG. 3 is a side view of the cable clamp of FIG. 1;

FIG. 4 is an exploded, perspective view of the cable clamp of FIG. 1;

FIG. 18 is a front view of a spool of the cable clamp of FIG. 11;

FIG. 19 is a top view of the spool of FIG. 18;

FIG. 22 is a front, top perspective view of another cable anchoring device in accordance with the principles of the present disclosure;

FIG. 23 is a front, bottom view of the cable anchoring device of FIG. 22;

FIG. 24 is a perspective view of the cable anchoring device of FIG. 22 with a protective cover removed to show an underlying main cable securement component;

FIG. 25 is a front, plan view of the cable anchoring device of FIG. 22;

FIG. 26 is a back, plan view of the cable anchoring device of FIG. 22;

FIG. 27 is a front, plan view of the main cable securement component of FIG. 24;

FIG. 44 is a cross-sectional perspective view of a stack of the cable anchoring device of FIG. 30 with one of the cable anchoring devices opened and the other closed;

FIG. 45 is another cross-sectional view of the stack of FIG. 44 with both of the cable anchoring devices closed;

DETAILED DESCRIPTION

In fiber optic networks, such as FTTP networks, it is often desirable to route fiber optic cables (e.g., drop cables and stub cables) vertically along a structure such a building, pole, wall or other structure. For example, fiber optic cables can be directed to a subscriber's residence or office space by routing the fiber optic cable along the side of a building. When routing fiber optic cable vertically along a structure, it is desirable to provide one or more anchor points where the hanging weight of the fiber optic cable as well as other loads applied to the cable can be transferred to the structure on which the cable is being routed. For certain applications, it is desirable for the anchoring point to be able to withstand over 100 pounds of downward loading without causing damage to the fiber optic cable.

Figure 1:
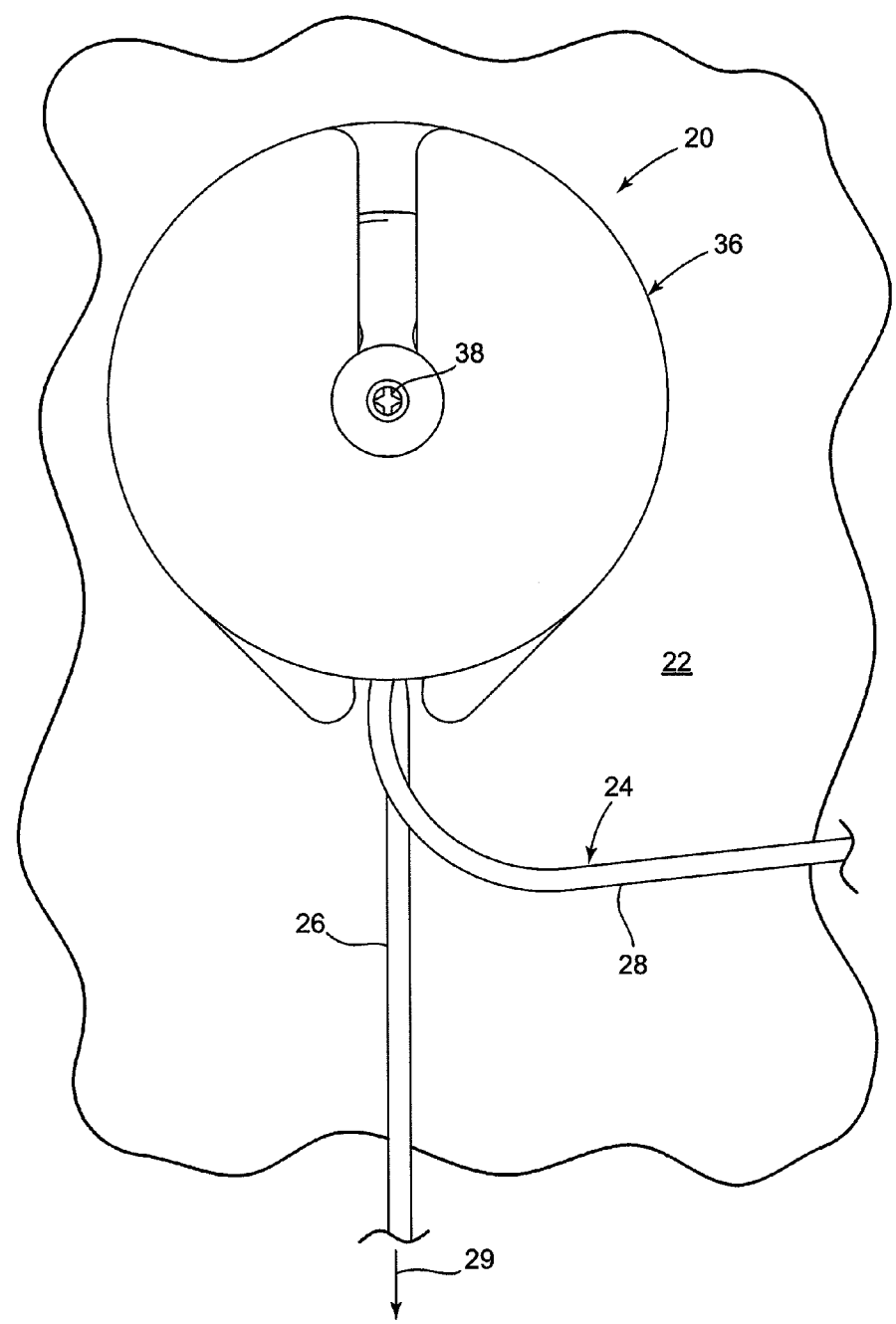
FIG. 1 shows a cable clamp in accordance with the principles of the present disclosure mounted to a structure such as the side of a building.
Figure 5:
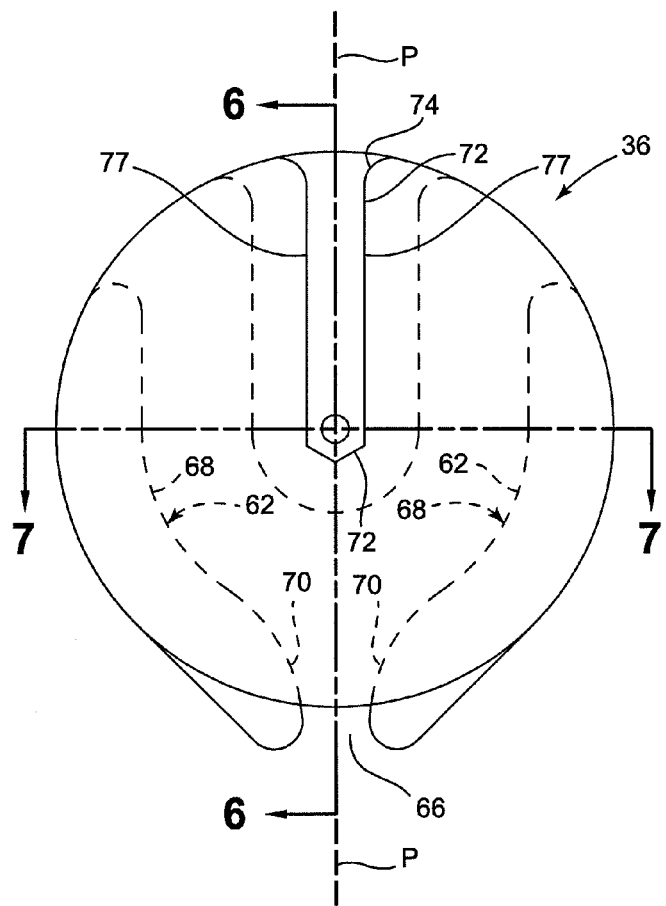
FIG. 5 is a front view of the cable clamp of FIG. 1.
Figure 7:
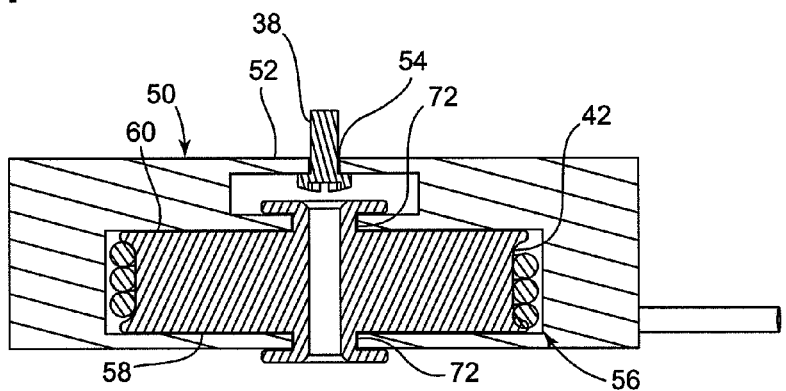
FIG. 7 is a cross-sectional view taken along section line 7-7 of FIG. 5.
Figure 6:
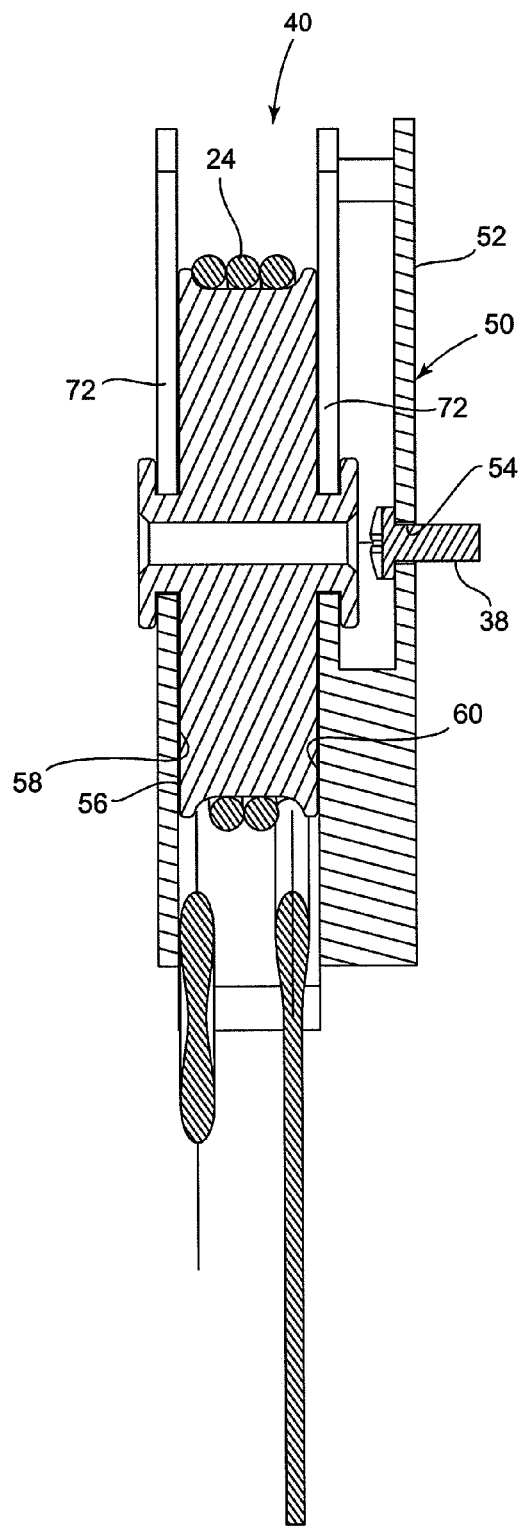
FIG. 6 is a cross-sectional view taken along section line 6-6 of FIG. 5.

FIG. 1 shows a cable clamp 20 in accordance with the principles of the present disclosure. The cable clamp 20 is shown mounted to a structure 22 (e.g., a building, wall, pole or other structure) on which a fiber optic cable 24 is routed. The fiber optic cable 24 is anchored to the structure 22 by the cable clamp 20 and includes a vertical portion 26 that hangs below the cable clamp 20 and a horizontal portion 28 that is routed laterally from the cable clamp 20. It is desirable for the cable clamp 20 to be able to support a downward load 29 applied by the vertical portion 26 that is in excess of 100 pounds without causing damage to the fiber optic cable 24 and without allowing slippage of the fiber optic cable 24 within the cable clamp 20.

Figure 20:
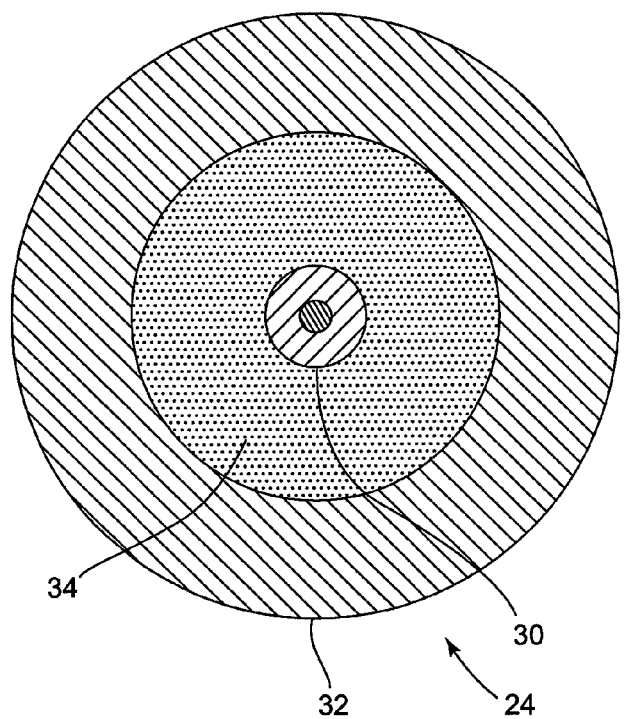
FIG. 20 is a cross-sectional view of an example fiber optic cable adapted for use with clamps in accordance with the principles of the present disclosure.

Referring to FIG. 20, an example configuration for the fiber optic cable 24 is depicted. As shown at FIG. 20, the fiber optic cable 24 includes an optical fiber 30 (e.g., bend insensitive fiber) positioned within a polymeric jacket 32. A strength layer 34 is positioned between the optical fiber 30 and the polymeric jacket 32. In certain embodiments, the strength layer 34 can include a plurality of aramid yarns that extend along the length of the fiber optic cable 24. The strength layer 34 functions to prevent tension from being applied to the optical fiber 30. In certain embodiments, the fiber optic cable 24 has an outer diameter less than 6 millimeters.

Figure 21:
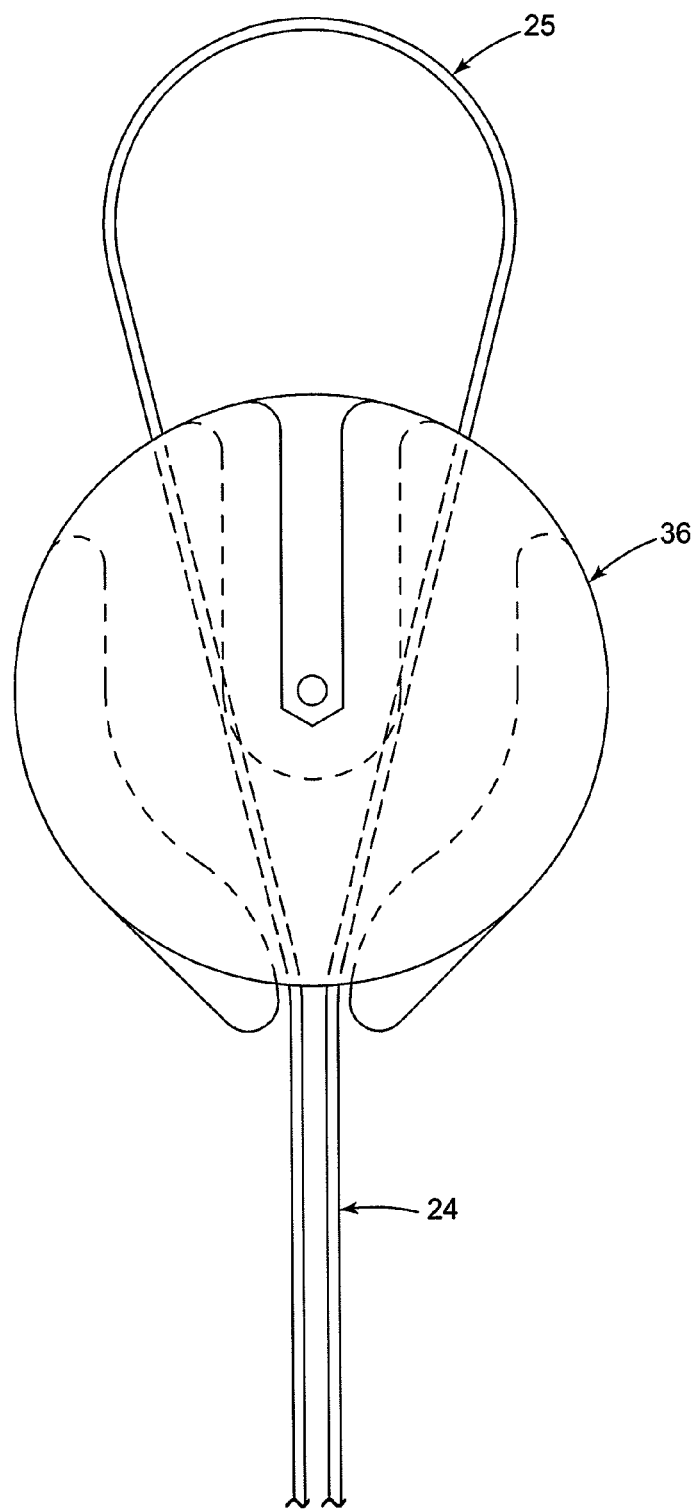
FIG. 21 shows a fiber optic cable being inserted through the spool receiver of the cable clamp of FIGS. 1-7.
Figure 28:
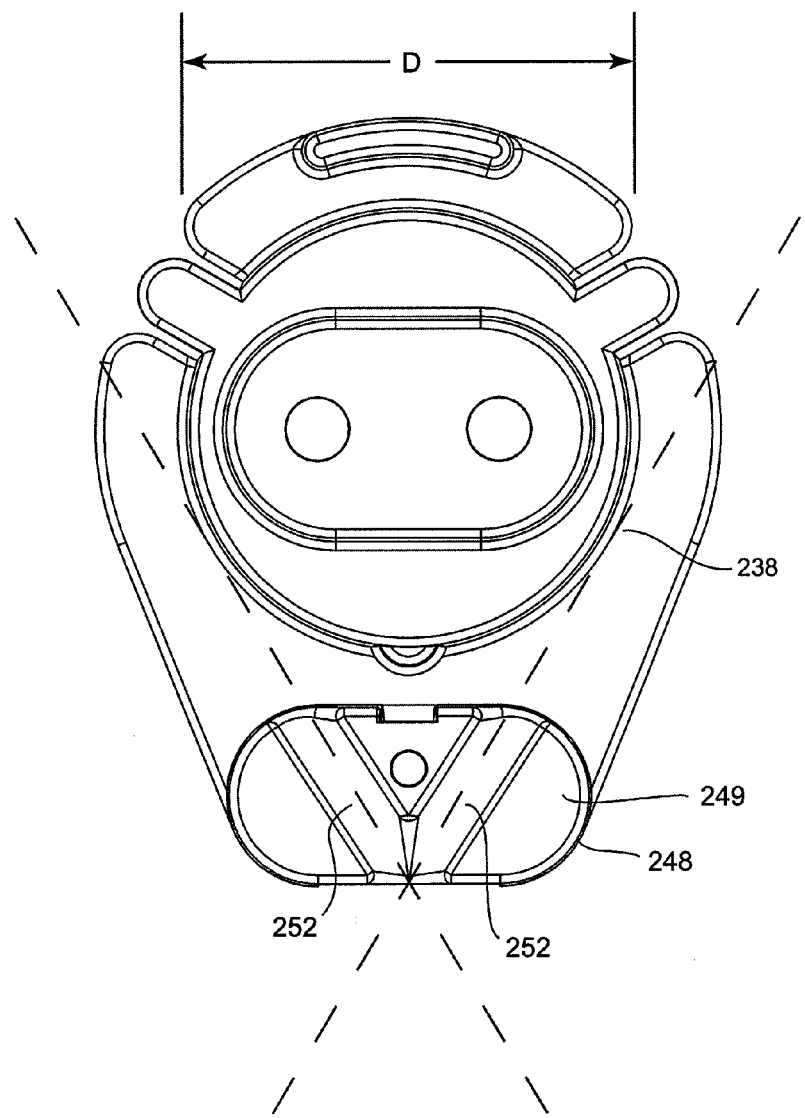
FIG. 28 is a front, plan view of the main cable securement component of FIG. 24 with a removable clamping member removed.

Referring now to FIGS. 4-7, the cable clamp 20 includes a spool receiver 36 that is mounted to the structure 22 by a fastener 38 such as a screw, bolt, nail or other fastener. The spool receiver 36 defines a cradle 40 for receiving a spool 42 (i.e., a mandrel) about which the fiber optic cable 24 is wrapped. In use of the cable clamp 20, the spool receiver 36 is initially secured to the structure 22 using the fastener 38. Next, a half-loop 25 of the fiber optic cable 24 is passed upwardly through the cradle as shown at FIG. 21. The spool 42 is then inserted within the half-loop and portions of the fiber optic cable 24 are manually wrapped around the spool 42. After the fiber optic cable 24 has been wrapped multiple times about the spool 42, the spool 42 is inserted downwardly into the cradle such that the fiber optic cable 24 is secured within the cradle 40 and effectively anchored to the structure 22. It is preferred for the fiber optic cable 24 to be wrapped at least three times around the spool 42 of the cable clamp 20.

Referring to FIGS. 1-7, the spool receiver 36 of the cable clamp 20 includes a base portion 50 including a rear base plate 52 defining a fastener opening 54 for receiving the fastener 38. The spool receiver 36 also includes a cradle portion 56 that defines the cradle 40. A pocket 78 is defined between the rear base plate 52 and the cradle portion 56. The cradle portion 56 is positioned in front of the base portion 50 and includes front and back cradle defining surfaces 58, 60 that oppose one another. The cradle portion 56 also includes bottom cradle defining surfaces 62 that define a bottom of the cradle 40. The bottom cradle defining surfaces 62 extend between the front and back cradle surfaces 58, 60 and are separated by a bottom gap 66 configured for allowing the half-loop of the fiber optic cable 24 to be fed upwardly through the cradle spool receiver 36. Each of the bottom cradle defining surfaces 62 includes a concave region 68 having a curvature that generally matches an outer curvature of the spool 42 and a convex region 70 positioned adjacent the gap 66. The convex regions 70 are preferably configured so that the portions 26, 28 of the fiber optic cable 24 comply with minimum bend radius requirements.

The front and back cradle defining surfaces 58, 60 define upright slots 72. The upright slots 72 include open upper ends 74 and closed lower ends 76. The upright slots 72 are defined through the front and back surfaces 58, 60 by vertical edges 77 of the cradle 40 that extend from the closed lower ends 76 to the open upper ends 74. The upright slots 72 are aligned along a vertical plane P that bisects the spool receiver 36 in a front-to-back direction. The fastener opening 54 is also aligned along the vertical plane P. When the spool 42 is removed from the spool receiver 36, the upright slots 72 provide access to the fastener opening 54 from the front of the spool receiver 36 to allow the fastener 38 to be readily mounted through the fastener opening 54 and into the structure 22 with the use of a driving tool that can be inserted through the upright slots 72 in a front-to-rear direction.

Figure 10:
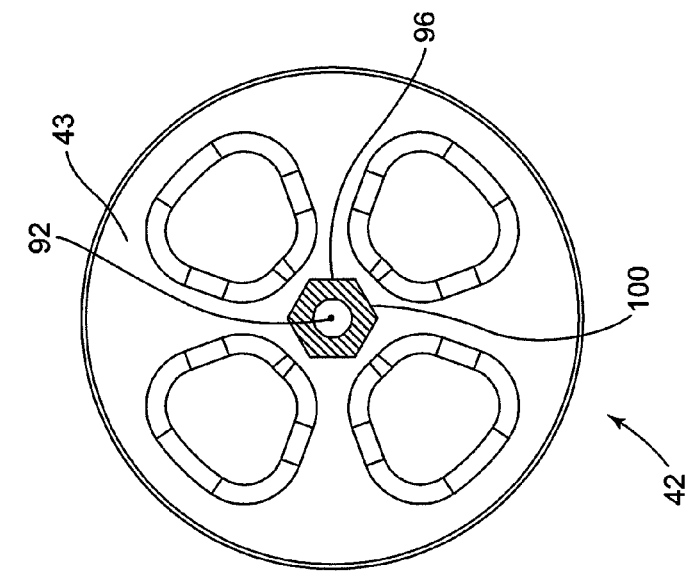
FIG. 10 is a cross-sectional view taken along section line 10-10 of FIG. 9.
Figure 9:
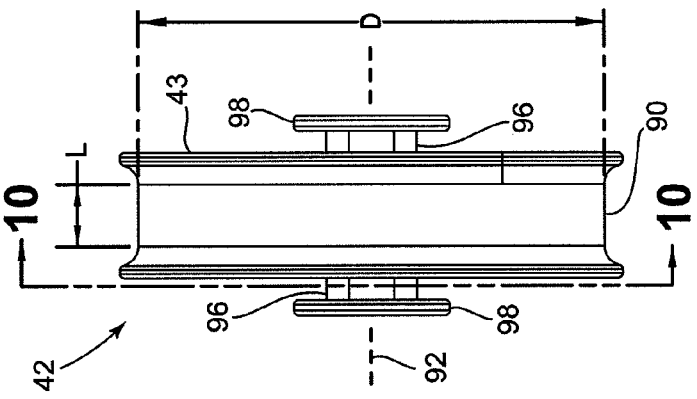
FIG. 9 is a top view of the spool of FIG. 8.
Figure 8:
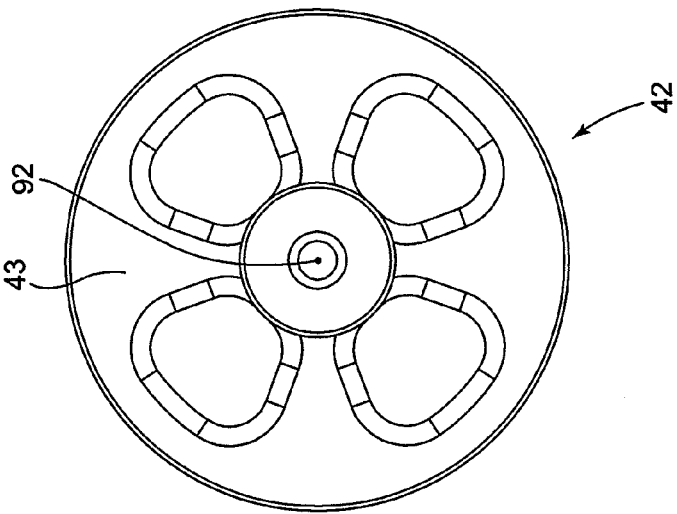
FIG. 8 is a front view of a spool of the cable clamp of FIG. 1.
Figure 11:
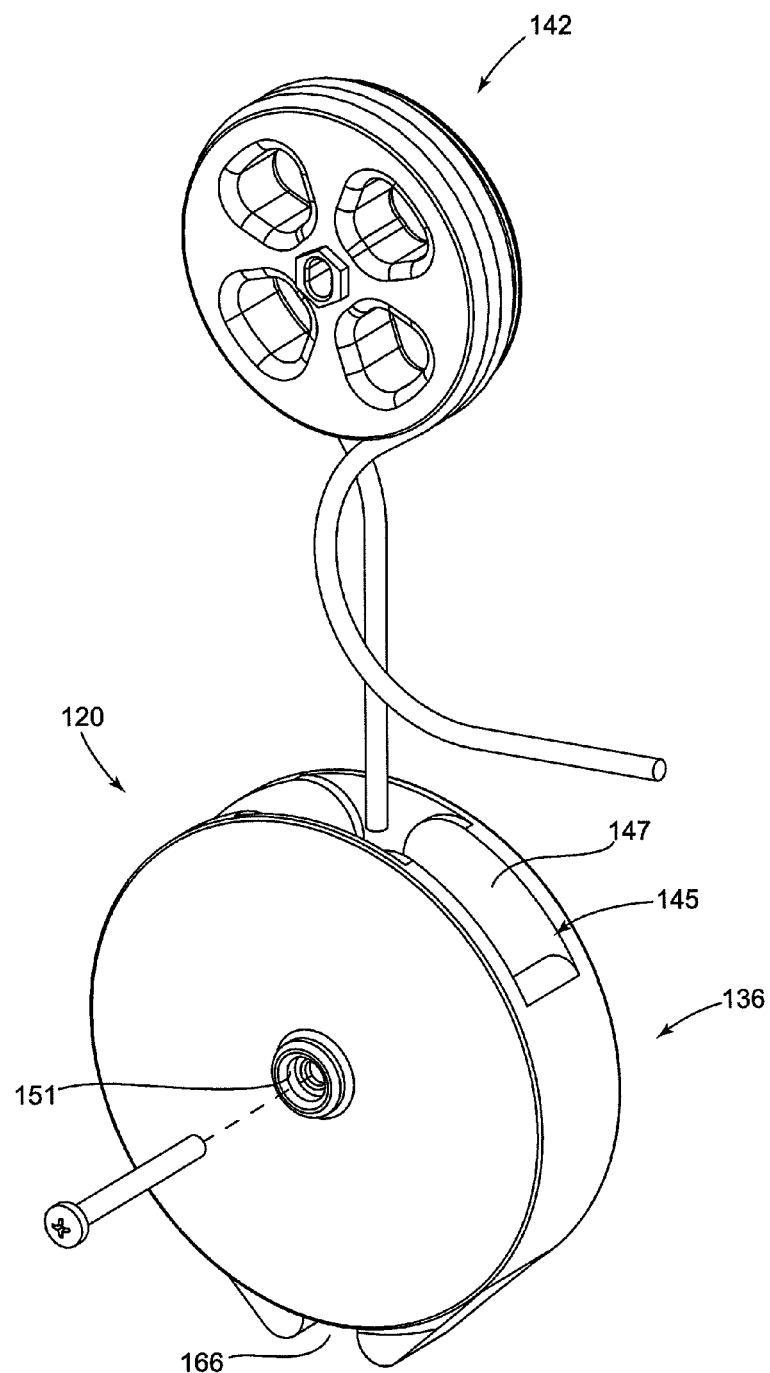
FIG. 11 is an exploded, perspective view of another cable clamp in accordance with the principles of the present disclosure.
Figure 12:
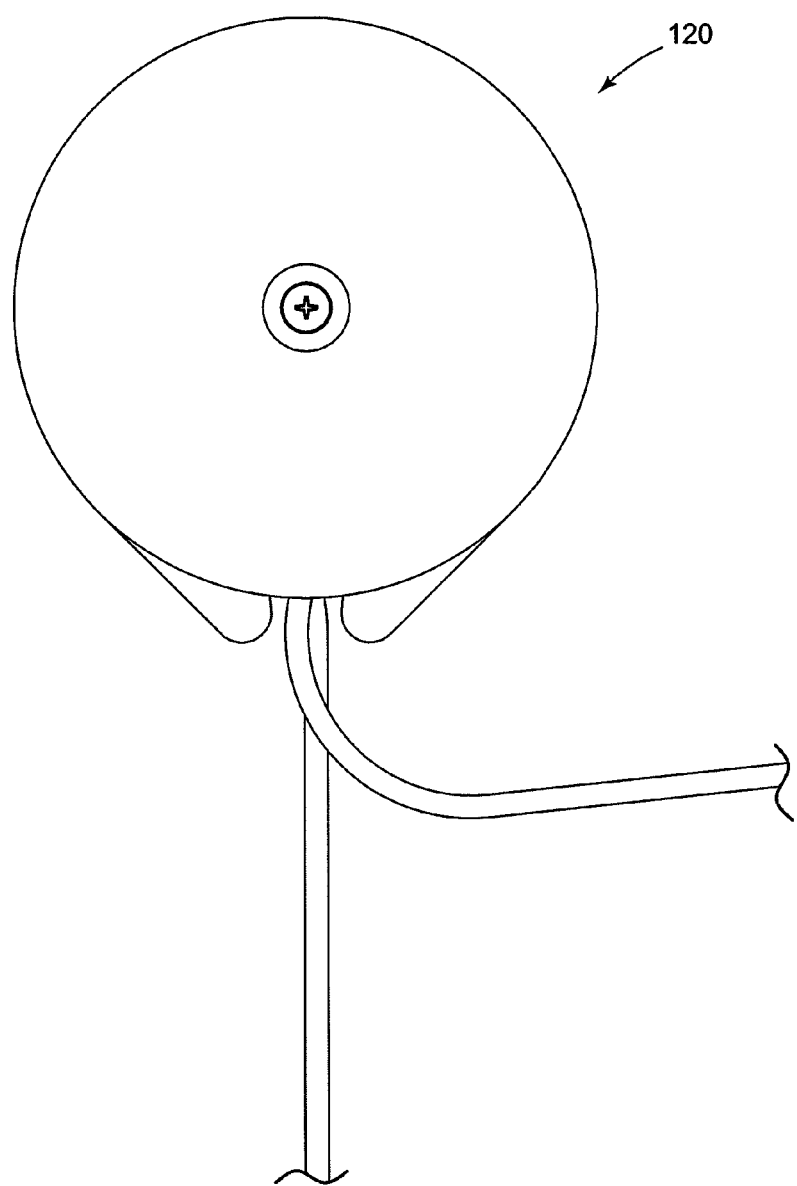
FIG. 12 is a front view of the cable clamp of FIG. 11.
Figure 13:
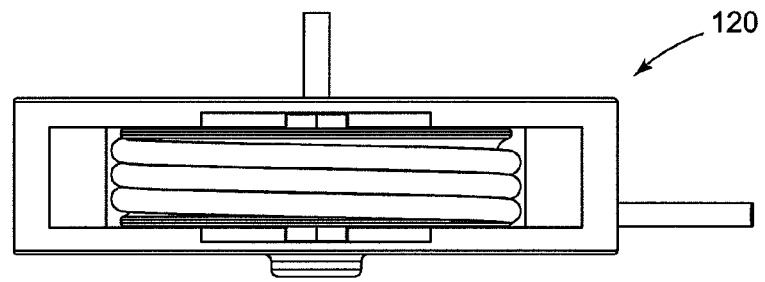
FIG. 13 is a top view of the cable clamp of FIG. 11.
Figure 14:
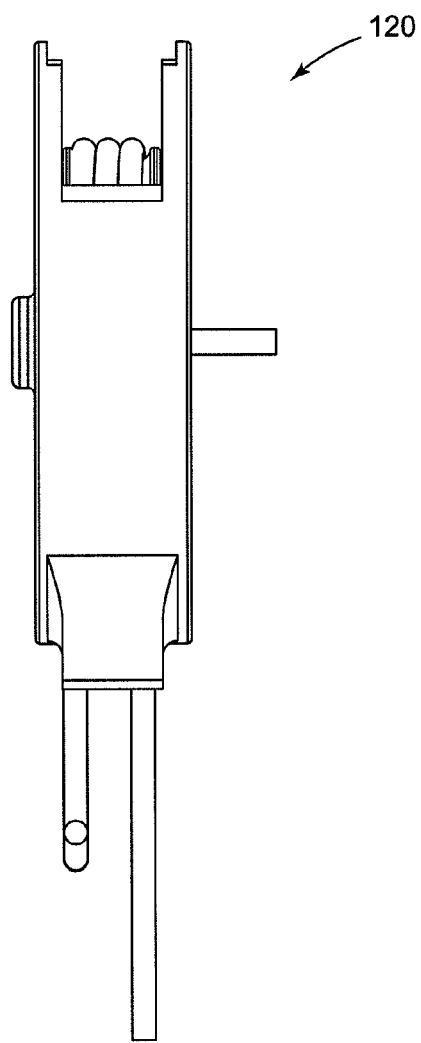
FIG. 14 is a side view of the cable clamp of FIG. 11.
Figure 15:
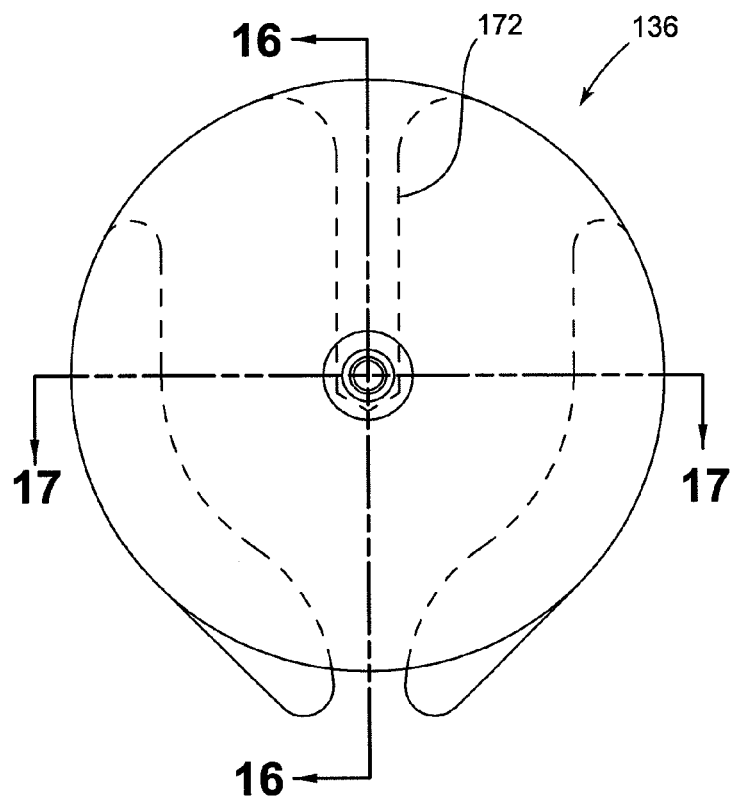
FIG. 15 is a front view of the cable clamp of FIG. 11 with internal components shown in hidden lines.
Figure 17:
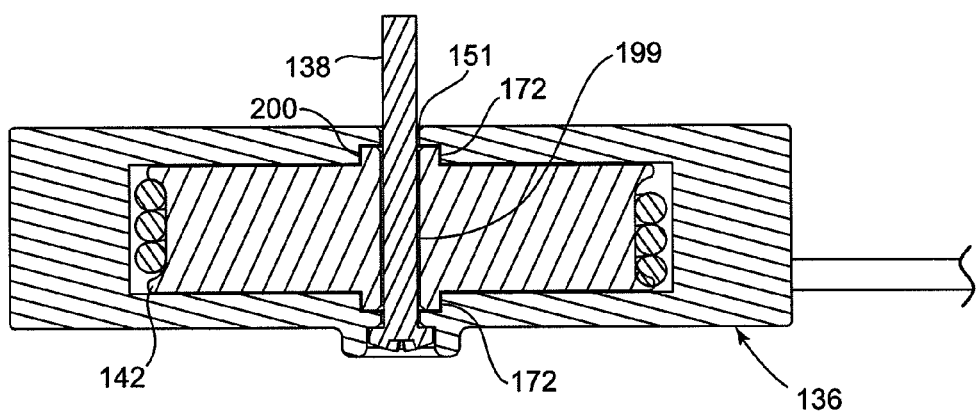
FIG. 17 is a cross-sectional view taken along section line 17-17 of FIG. 15.
Figure 16:
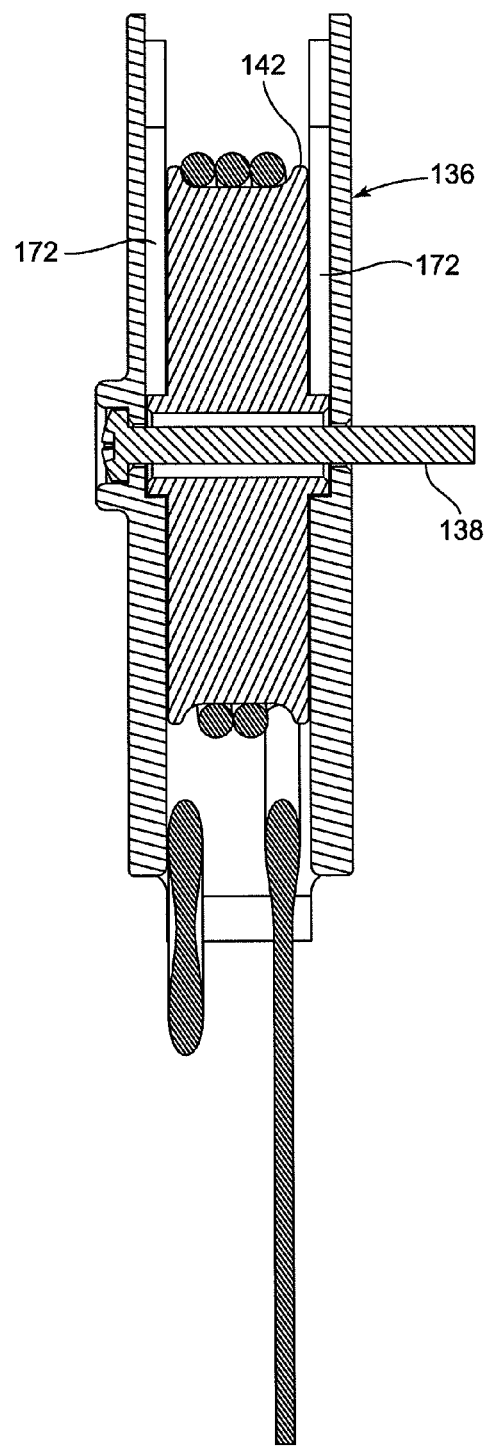
FIG. 16 is a cross-sectional view taken along section line 16-16 of FIG. 15.

Referring to FIGS. 8-10, the spool 42 includes a main body 43 defining a generally cylindrical cable engaging surface 90 that extends around a central axis 92 of the spool 42. The cable engaging surface 90 can include a textured surface (e.g., knurling, bumps, projections, ridges, grooves, or other structures) adapted for increasing friction between the cable engaging surface 90 and the fiber optic cable 24. The cable engaging surface 90 preferably has a diameter D of at least two inches and more preferably has a diameter D of at least three inches. The cable engaging surface 90 also has an axial length L that extends in a direction parallel to the central axis 92. It is preferred for the length L to be equal to or greater than three times the outer diameter of the fiber optic cable 24. This provides sufficient space to allow the fiber optic cable 24 to be wrapped three times around the cable engaging surface 90 with all three wraps of the fiber optic cable engaging the cable engaging surface 90 of the spool 42. Flanges 94 are provided at opposite ends of the length L. The flanges 94 project radially outwardly from the cable engaging surface 90 and function to prevent fiber optic cable 24 from slipping off the cable engaging surface 90 in an axial direction.

Referring still to FIG. 8-10, the spool 42 also includes posts 96 that project outwardly from front and back sides of main body 43 of the spool 42. The posts 96 are coaxially aligned along the central axis 92. Outer flanges 98 are provided at the ends of the posts 96 at a distance spaced from the front and back sides of the main body 43 of the spool 42. As shown at FIG. 10, the posts 96 include one or more flats 100 when viewed in transverse cross-section. Additionally, when the spool 42 is mounted within the cradle 40, an opening defined through the posts 96 aligns with the fastener opening 54 and its corresponding fastener 38 to allow access to the fastener through the spool 42 with a tool such as a screwdriver.

In use of the cable clamp 20, the spool 42 is removed from the spool receiver 36 and the spool receiver 36 is secured to the structure 22 with the fastener 38. Next, the half-loop of the fiber optic cable 24 is inserted upwardly through the gap 66 of the cradle 40 and is pushed through the top side of the cradle 40. The portion of the fiber optic cable 24 positioned above the cradle 40 is then wrapped a plurality of times around the spool 42. After the fiber optic cable has been wrapped around the spool 42, the spool 42 is inserted downwardly into the cradle 40 with the posts 96 being received in the upright slots 72. The flats 100 provided on the posts 96 engage the edges 77 of the slots 72 to prevent the spool 42 from rotating relative to the spool receiver 36. Additionally, the vertical portion 26 of the fiber optic cable 24 is compressed between the cable engaging surface 90 and the convex region 70 of one of the cradle defining surfaces 62. This compressive action creates a pinch point that prevents the fiber optic cable 24 from sliding/slipping relative to the cable engaging surface 90 of the spool 42.

FIGS. 11-19 show another cable clamp 120 in accordance with the principles of the present disclosure. The cable clamp 120 includes a spool receiver 136 defining a cradle 140 for receiving a spool 142. The cradle 140 defines an upper side 145 having an opening 147 sized for receiving the spool 142 into the cradle 140. The cradle also defines a bottom side 149 configured for supporting the spool 142 within the cradle. The bottom side 149 defines a central gap 166 sized for allowing a half-loop of a cable to be passed upwardly through the cradle 140. The spool receiver 136 also defines a fastener opening 151 that extends through a central portion of the spool receiver 136 in a front-to-back direction. The cradle 140 also defines upright slots 172. The spool 142 includes a main body 143 defining a spool surface 190 about which a cable can be wrapped. The spool 142 also includes posts 196 that project outwardly from front and back sides of the main body 143. The posts 196 are co-axially aligned along a central axis 197 of the spool 142 and include flats 200. The spool 142 also defines a fastener opening 199 that extends through the posts 196 and is centered on the central axis 197.

In use of the cable clamp 120, the spool 142 is removed from the spool receiver 136. Next, a half-loop of the fiber optic cable is inserted upwardly through the gap 166 of the cradle 140 and is pushed through the top side of the cradle 140. The portion of the fiber optic cable positioned above the cradle 140 is then wrapped a plurality of times around the spool 142. After the fiber optic cable has been wrapped around the spool 142, the spool 142 is inserted into the cradle 140 through the top side of the cradle 140 with the posts 196 being received in the upright slots 172. The flats 200 provided on the posts 196 engage the edges of the slots 172 to prevent the spool 142 from rotating relative to the spool receiver 136. When the spool 142 is fully inserted within the cradle 140, the fastener opening 151 of the spool receiver 136 co-axially aligns with the fastener opening 199 of the spool 142. A fastener 138 is then inserted through the aligned openings 151, 199 and is used to secure the cable clamp 120 the structure along which the cable is routed.

FIGS. 22-29 show another cable anchoring device 220 in accordance with the principles of the present disclosure. The cable anchoring device 220 includes a main cable securing component 222 having a front side 224 (see FIG. 27) positioned opposite from a back side 226. Fastener openings 228 extend through the main cable securing component 222 in a direction extending from the front side 224 to the back side 226. The fastener openings 228 are adapted to receive fasteners such as bolts or screws used to attach the main cable securing component 222 to a building, wall, pole or other structure. The cable anchoring device 220 also includes a protective cover 230 that mounts over the front side 224 of the main cable securing component 222.

Referring to FIGS. 24 and 27, the main cable securing component 222 includes a base 232 having a generally plate-like configuration. The main cable securing component 222 also includes a spool 234 and a clamp 236 carried by the base 232. The spool 234 includes a spooling portion 238 about which a plurality of wraps of fiber optic cable 24 can be routed. The spooling portion 238 is formed by a generally cylindrical member having a back end 239 that is integrally formed with the base 232 and a front end 241 that is forwardly offset from the base. The cylindrical member is centered about a spooling axis 240. In alternative embodiments, the spooling portion 238 can have alternative shapes such as elliptical shapes, obround shapes, octagonal shapes, or other shapes suitable for allowing a fiber optic cable to be wrapped thereabout. The spool 234 also includes a plurality of fiber retention tabs 242 that project radially outwardly from the front end of the spooling portion 238. The retaining tabs 242 are adapted for preventing fiber optic cable wrapped about the spooling portion 238 from sliding axially off the front end 241 of the spooling portion 238. The main cable securing component 222 also includes a cable routing member 244 that is integrally formed with the base 232 at a location radially offset from the spooling portion 238. A gap 246 is defined between the spooling portion 238 and the cable routing member 234 for receiving fiber optic cable spooled about the spooling portion 238.

The clamp 236 of the main cable securing component 222 includes a fixed clamping member 248 and a removable clamping member 250. The fixed clamping member 248 includes a front end 249 positioned opposite from a back end 251. The back end 251 of the fixed clamping member 248 is integrally formed with the base 232. The front end 249 of the fixed clamping member 248 includes two cable clamping slots 252 that are angled relative to one another. In a preferred embodiment, the cable clamping slots 252 are each aligned along a line generally tangent to a spooling surface of the spooling portion 238. The removable clamping member 250 mounts to the front end 249 of the fixed clamping member 248. The removable clamping member 250 includes a plurality of resilient latches 254 that engage corresponding catches 255 provided on the fixed clamping member 248 so as to retain the removable clamping member 250 on the fixed clamping member 248. Preferably, the resilient latches 254 engage the catches 255 by a snap-fit connection arrangement. By placing a fiber optic cable in one of the cable clamping slots 252 while the removable clamping member 250 is removed from the fixed clamping member 248, and then by mounting the removable clamping member 250 at the front end of the fixed clamping member 248, the fiber optic cable is effectively clamped between the fixed clamping member 248 and the removable clamping member 250. By flexing the resilient latches 254 away from the fixed clamping member 248, the resilient latches 254 can be disengaged from the catches 255 of the fixed clamping member 248 so as to allow the removable clamping member 250 to be removed from the fixed clamping member 248.

Once the fiber optic cable has been routed multiple wraps around the spool 234 and clamped within one of the cable clamping slots 252, the protective cover 230 can be mounted over the main cable securing component 222. The protective cover 230 includes a front face plate 256 that covers the front side 224 of the main cable securing component 222, and a circumferential shroud 258 that extends rearwardly from the front face plate 256 and circumferentially surrounds a portion of the spooling portion 238. Flexible latches 260 are provided at the circumferential shroud 258. The flexible latches 260 preferably engage catches 262 provided on the base 232 to secure the protective cover 230 to the main cable securing component 222 by a snap-fit connection. By flexing the flexible latches 260 away from the main cable securing component 222, the flexible latches 260 can be disengaged from the catches 262 thereby allowing the protective cover 230 to be removed from the main cable securing component 222.

It is preferred for the spooling portion 238 to define a diameter D of at least 2 inches. It is also preferred for the spooling portion 238 to have an axial length L that is equal to or greater than 2 or 3 times the outer diameter of a fiber optic cable 24 intended to be wrapped around the spooling portion 238.

Figure 29:
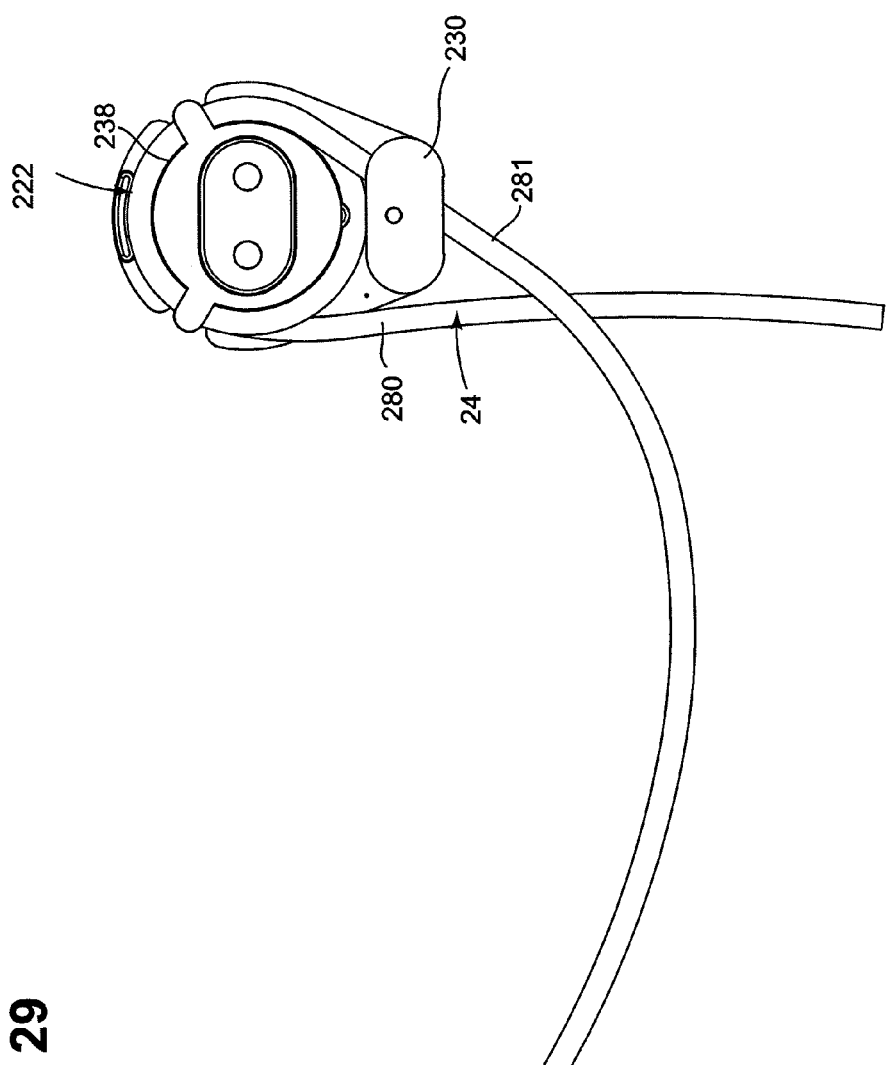
FIG. 29 shows the cable anchoring device of FIG. 22 anchoring a fiber optic cable to a structure such as a building, the protective cover has been removed from the main cable securement component to better show the cable routing that occurs at the cable anchoring device.

In use of the cable anchoring device 220, the protective cover 230 is removed from the main cable securing component 222 and the main cable securing component 222 is secured to a structure by fasteners that are inserted through the fastener openings 228 (see FIG. 29). As so mounted, the clamp 236 is preferably positioned directly below the spool 234. The removable clamping member 250 is then removed from the fixed clamping member 248. Thereafter, a fiber optic cable 24 is wrapped at least two times and preferably two and a half times around the spooling portion 238 starting at the nine o'clock position and ending at the three o'clock position. Preferably, the fiber optic cable 24 is routed so that a vertical portion 280 to which load may be applied initially engages the spool at the nine o'clock position and is wrapped in a forward clockwise spiral about the spooling portion 238 for two and a half wraps starting adjacent the back end 239 of the spooling portion 238 and ending adjacent the front end 241 of the spooling portion 238. After the cable 24 has been wrapped two and half times around the spooling portion 238 from the nine o'clock position to the three o'clock position, the forward portion of the wrap is tangentially routed through the cable clamping slot 252 that is generally tangent to the three o'clock position of the spooling portion 238. If the cable were initially routed vertically up against the three o'clock position of the spooling portion 238, the cable would be wrapped two and a half times in a counterclockwise direction to the nine o'clock position and then routed tangentially through the other cable clamping slot 252.

Once the cable is routed through the cable clamping slot 252, the removable clamping member 250 is mounted on the fixed clamping member 248 to clamp the fiber optic cable 24 therein between. A portion 281 of the cable routed through the cable clamping slot 252 can be routed to an end user. A clockwise routing pattern is used to route the cable to an end user located right of the cable anchoring device 220 (see FIG. 29), while a counterclockwise wrapping pattern is used to route the fiber optic cable to an end user left of the cable anchoring device 220. Once the fiber optic cable is wrapped about the spooling portion 238 and clamped between the removable clamping member 250 and the fixed clamping member 248, the protective cover 230 is mounted over the main cable securing component 222 to complete the installation process.

Figures 30, 31:
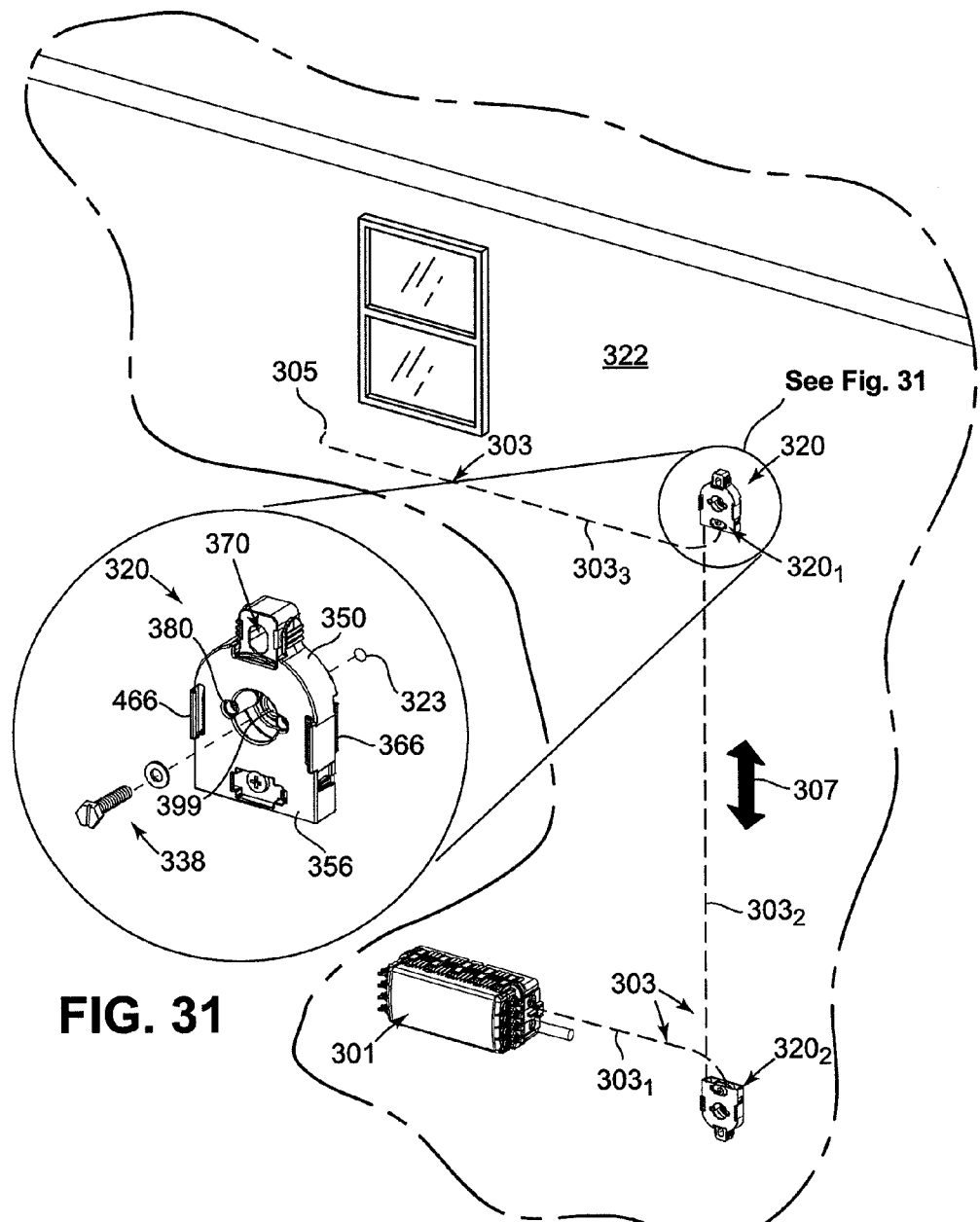
FIG. 30 shows another cable anchoring device routing a fiber optic cable on a building.
FIG. 31 is an enlarged view of a portion of FIG. 30.

FIGS. 30-41 show another cable anchoring device 320 in accordance with the principles of the present disclosure. The cable anchoring device 320 includes a main cable securing component 350 having a front side 324 (see FIG. 33) positioned opposite from a back side 326 (see FIG. 36). The cable anchoring device 320 also includes a protective cover 356 that mounts over the front side 324 of the main cable securing component 350. A fastener opening 399 extends through the main cable securing component 350 in a direction extending from the front side 324 to the back side 326. The fastener opening 399 is adapted to receive fasteners such as bolts or screws used to attach the main cable securing component 350 to a building, wall, pole, or other structure. FIG. 31 illustrates a fastener 338 that is used to attach the cable anchoring device 320 to a building 322. The fastener 338 is inserted through the fastener opening 399 and through an attachment hole 323 on the building 322. The cable anchoring device 320 can also include another opening 370 (e.g., a hole, a hook eye, or a hook hole) that can be used to hold and/or secure the cable anchoring device 320 to a supporting structure (e.g., a pole, cable, wall, building, hook, fastener, or other structure). The hook hole 370 can be used in conjunction with the fastener opening 399 or can be used with the fastener opening 399 absent or unused. Multiple fastener openings 399 and multiple fasteners 338 can be included in alternative embodiments. Multiple openings 370 can be included in alternative embodiments.

FIG. 30 illustrates how multiple cable anchoring devices 320 can be used to hold and route the fiber optic cable 24 along a fiber optic cable route 303. In the example installation illustrated at FIG. 30, the fiber optic cable 24 is routed from an optical termination enclosure 301 to a building entrance location 305. Tension (i.e. tensile loads) can be supported within the fiber optic cable 24 by multiple cable anchoring devices 320. As illustrated at FIG. 30, a tensile load in a direction 307 is supported between a first cable anchoring device $320_1$ and a second cable anchoring device $320_2$. The direction 307 in the example illustrated at FIG. 30 is a vertical direction. In other examples, the direction 307 can have other orientations. As illustrated at FIG. 30, the tension is developed in the fiber optic cable 24 along a second portion $303_2$ of the fiber optic cable route 303. A first portion $303_1$ and a third portion $303_3$ of the fiber optic cable route 303 have little, if any, tension developed in the fiber optic cable 24 by the first and second cable anchoring devices $320_1$, $320_2$. In other installations, tension can be developed in one or more portions of a fiber optic cable route by one or more of the cable anchoring devices 320. An upper cable anchoring device 320 can be used to support the fiber optic cable 24 under a gravitational load without a lower cable anchoring device 320.

Figure 36:
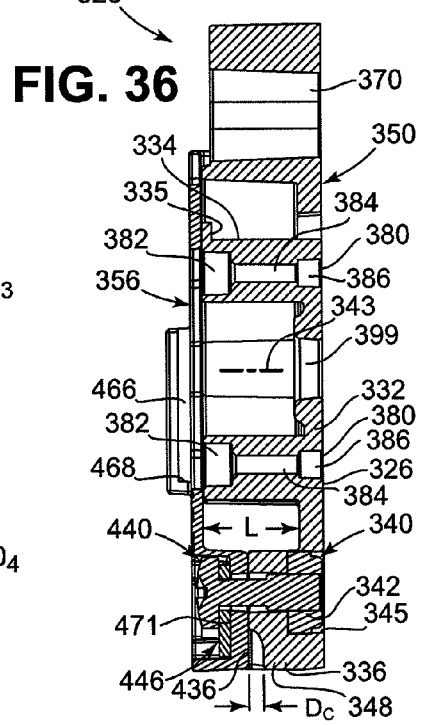
FIG. 36 is a cross-sectional side elevation view of the cable anchoring device of FIG. 30 in the closed configuration.
Figure 37:
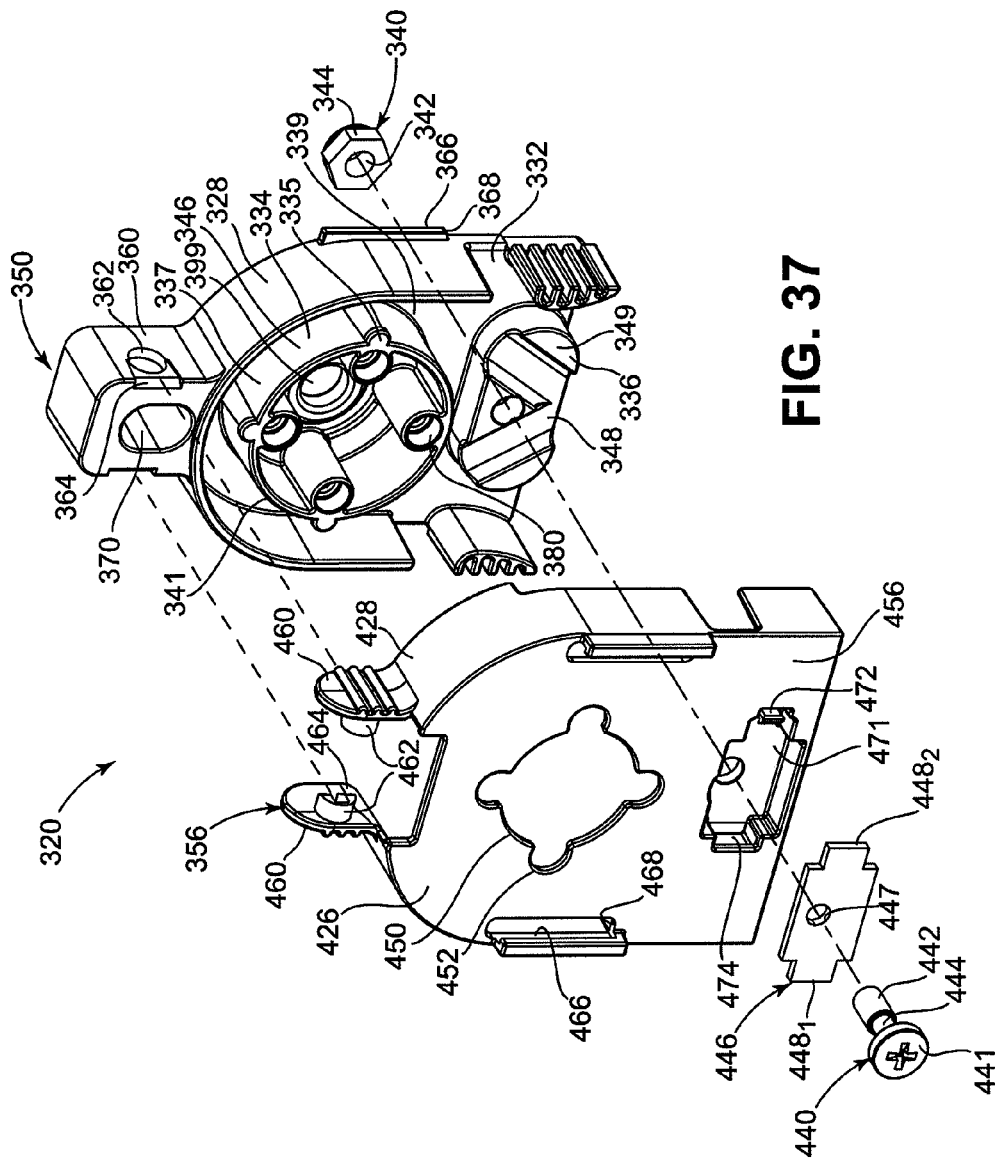
FIG. 37 is an exploded perspective view of the cable anchoring device of FIG. 30 in the closed configuration.
Figures 38, 39:
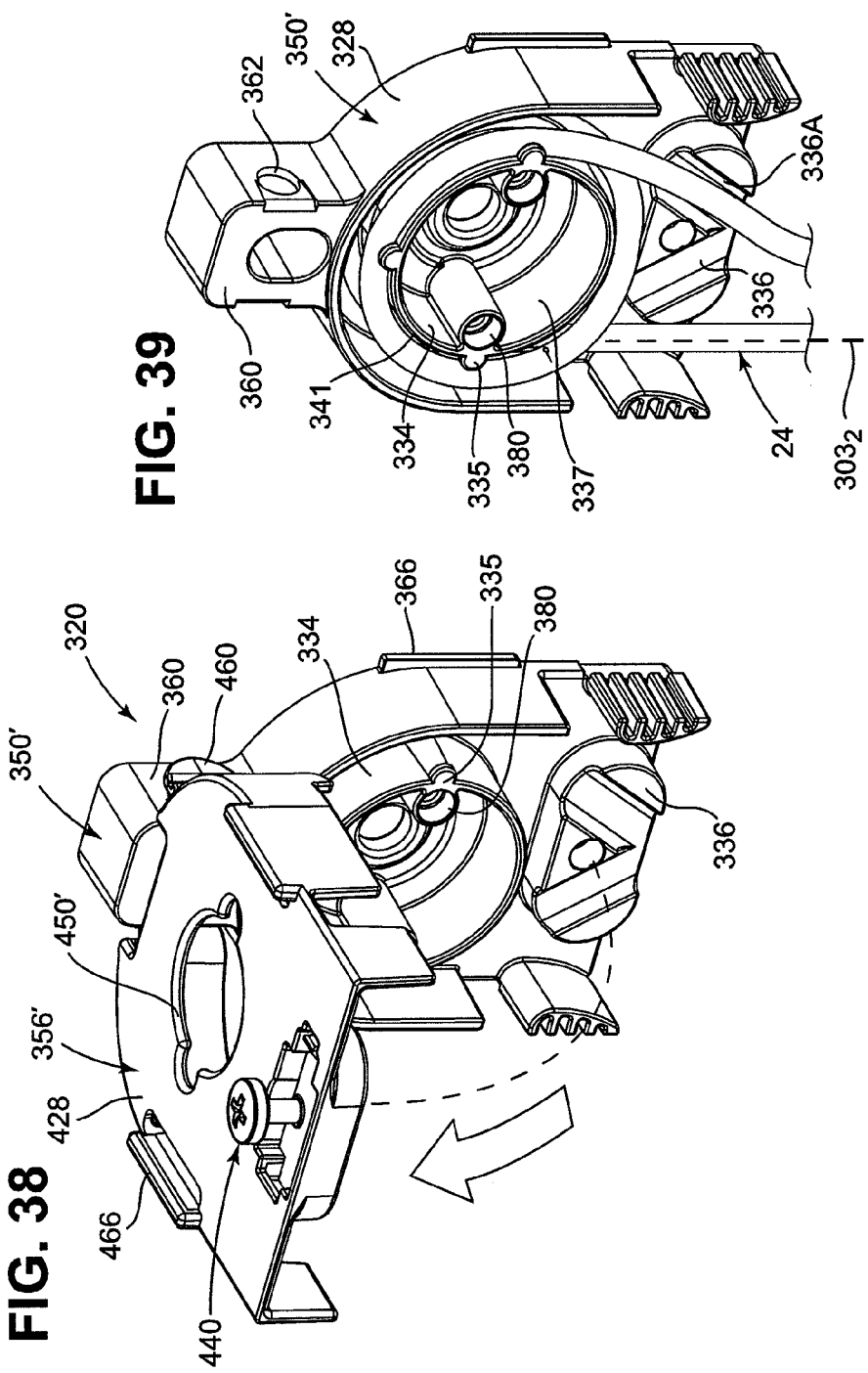
FIG. 38 is another perspective view of the cable anchoring device of FIG. 30 in an open configuration.
FIG. 39 is another perspective view of the cable anchoring device of FIG. 30 with a protective cover removed and a fiber optic cable routed therein.
Figure 41:
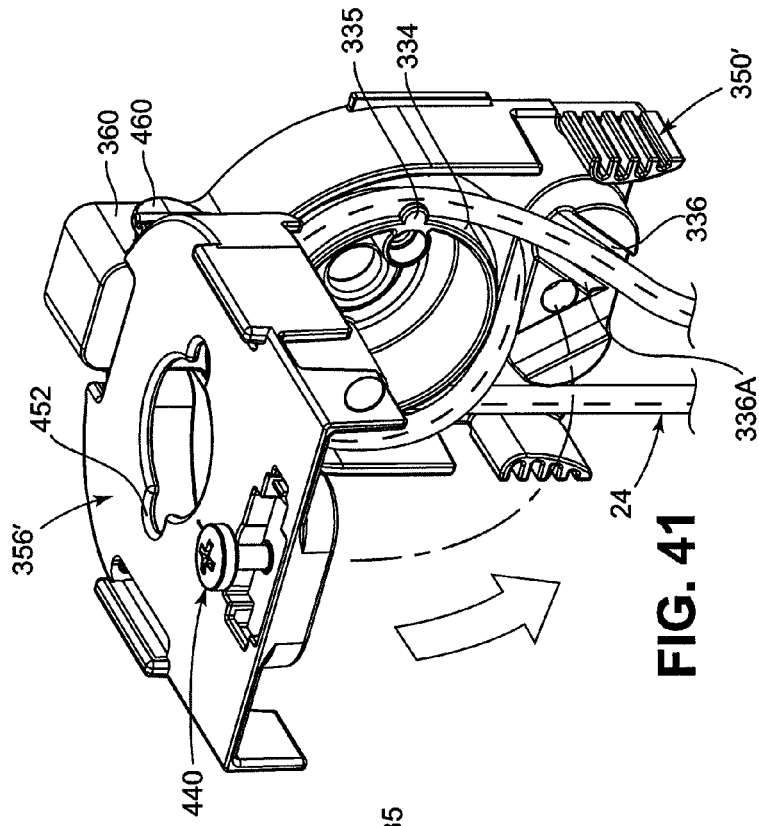
FIG. 41 is another perspective view of the cable anchoring device of FIG. 30 in an open configuration.
Figure 40:
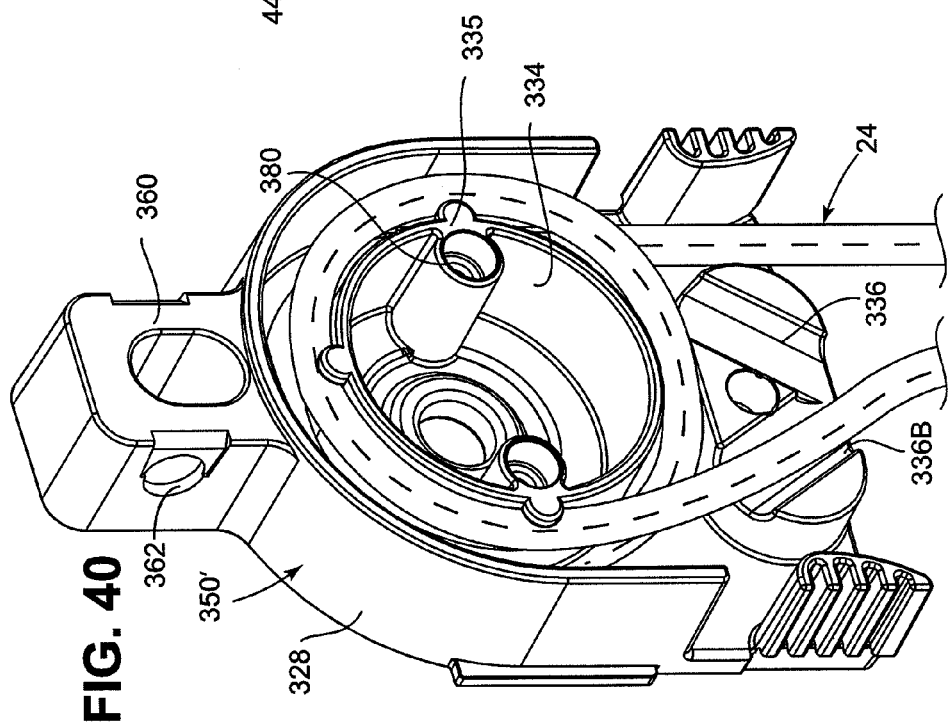
FIG. 40 is another perspective view of the cable anchoring device of FIG. 30 with the protective cover removed and a fiber optic cable routed therein.

Referring to FIGS. 36 and 37, the main cable securing component 350 includes a base 332 having a generally plate-like configuration. The main cable securing component 350 also includes a spool 334 and a clamp base 336 carried by the base 332. The spool 334 includes a spooling portion 337 about which a plurality of wraps of fiber optic cable 24 can be routed. The spooling portion 337 is formed by a generally cylindrical member having a back end 339 that is integrally formed with the base 332 and a front end 341 that is forwardly offset from the base 332. The cylindrical member is centered about a spooling axis 343 (see FIGS. 35 and 36). In alternative embodiments, the spooling portion 337 can have alternative shapes such as elliptical shapes, obround shapes, octagonal shapes, or other shapes suitable for allowing a fiber optic cable to be wrapped thereabout. The spool 334 also includes a plurality of fiber retention tabs 335 that project radially outwardly from the front end 341 of the spooling portion 337. The retaining tabs 335 are adapted for preventing fiber optic cable 24 wrapped about the spooling portion 337 from sliding axially off the front end 341 of the spooling portion 337. The main cable securing component 350 also includes a wall 328 that is integrally formed with the base 332 at a location radially offset from the spooling portion 337. A gap 346 is defined between the spooling portion 337 and the wall 328 for receiving and routing fiber optic cable 24 spooled about the spooling portion 337.

The clamp base 336 of the main cable securing component 350 can include a raised protrusion 348 extending above the base 332. The raised protrusion 348 includes a front end 349 positioned opposite from a back end 351 (see FIG. 33). The back end 351 of the raised protrusion 348 is integrally formed with the base 332. The front end 349 of the raised protrusion 348 can include two cable clamping slots 336A, 336B (i.e., cable clamping channels) that are angled relative to one another. In a preferred embodiment, the cable clamping slots 336A, 336B are each aligned along a line generally tangent to a spooling surface of the spooling portion 337 similar to the clamping slots 252 aligning with the spooling portion 238, as discussed above and illustrated at FIG. 28.

Figure 33:
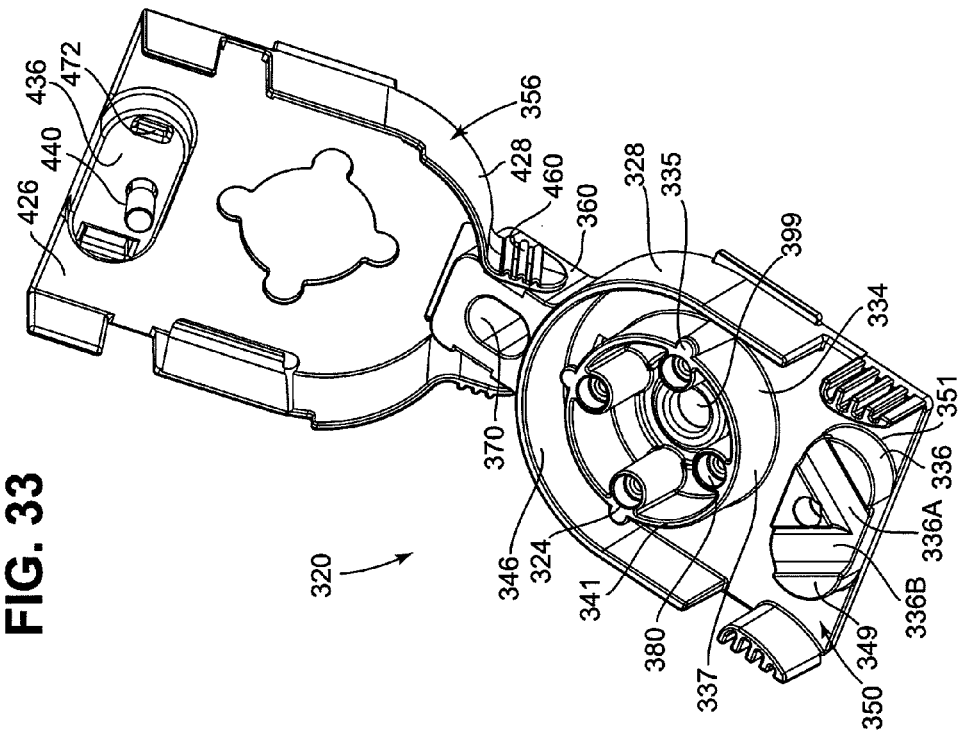
FIG. 33 is a perspective view of the cable anchoring device of FIG. 30 in an open configuration.
Figure 32:
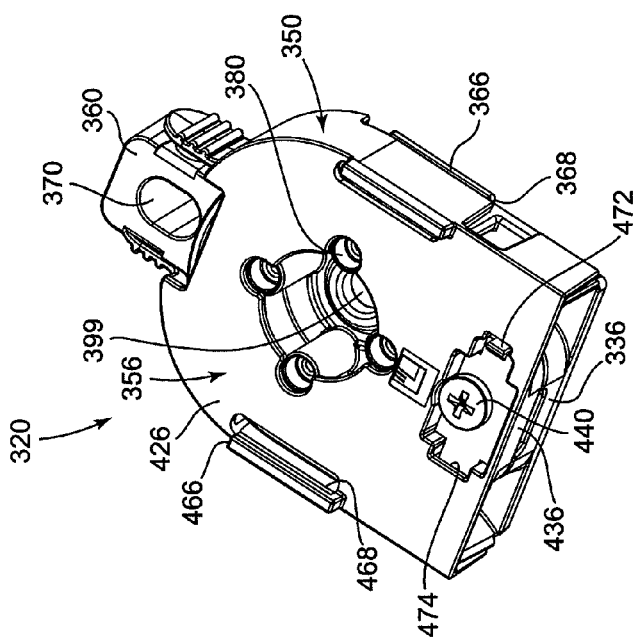
FIG. 32 is a perspective view of the cable anchoring device of FIG. 30 in a closed configuration.

The protective cover 356 includes a clamping surface 436 that forms a cable clamp with the clamp base 336 of the main cable securing component 350. The protective cover 356 can be rotatably mounted to the main cable securing component 350. As illustrated at FIGS. 32, 33, and 37, the main cable securing component 350 includes a lug 360 that includes a pivot hole 362. The mounting opening 370, discussed above, can also be included on the lug 360. The protective cover 356 can include a set of pivot pins 462 (see FIG. 37) adapted to engage the pivot hole 362 and thereby form a pivot joint between the protective cover 356 and the main cable securing component 350. As illustrated at FIG. 37, the protective cover 356 can include a pair of tabs 460 that join the pivot pins 462 to the rest of the protective cover 356. The pivot pins 462 can extend inwardly toward each other from the tabs 460 and include ramps 464. To assemble the protective cover 356 to the main cable securing component 350, the protective cover 356 is brought into proximity with the main cable securing component 350, as shown at FIG. 37, with the ramps 464 of the pivot pins 462 aligned with ramps 364 on the lug 360 that lead to the pivot hole 362. By pressing the pair of tabs 460 over the lug 360, the ramps 364, 464 engage each other and outwardly spread the pair of tabs 460 apart. The protective cover 356 and/or the pair of tabs 460 are preferably made of a resilient material, and therefore the pair of tabs 460 inwardly returns upon the pivot pins 462 reaching the pivot hole 362. The inward return of the tabs 460 engages the pivot pins 462 with the pivot hole 362 so that the protective cover 356 is rotatably mounted on the main cable securing component 350. The protective cover 356 is thus rotatably coupled to the main cable securing component 350 and stays attached when the cable anchoring device 320 is in normal use (e.g., when the protective cover 356 is opened and closed and when the cable anchoring device 320 is installed on a structure). The protective cover 356 can be removed from the main cable securing component 350 by spreading the pair of tabs 460 outwardly until the pivot pins 462 are disengaged from the pivot hole 362.

The cable anchoring device 320 includes a clamping arrangement that presses the clamping surface 436 of the protective cover 356 and the clamp base 336 together around the fiber optic cable 24. The cable anchoring device 320 includes a fastening system that holds the protective cover 356 closed when the cable anchoring device 320 is installed on a structure. In the embodiment illustrated at FIGS. 32, 33, 36 and 37, the clamping means and the fastening system are combined and include a first retainable fastener 440, a retainer/backing plate 446, and a second retainable fastener 340.

As shown at FIG. 37, the first retainable fastener 440 is a threaded male fastener with a head 441 including a drive engaging means (e.g., phillips head, flat head, hex head, etc.). The first retainable fastener 440 includes threads 442 and an undercut 444 positioned between the threads 442 and the head 441. The retainer/backing plate 446 includes a hole 447 that is preferably threaded. The threads 442 of the first retainable fastener 440 can be threaded into the hole 447 of the retainer/backing plate 446. As the threading continues, the undercut 444 reaches the hole 447 and the threads 442 are beyond the hole 447. The head 441 is thus positioned on one side of the retainer/backing plate 446, the threads 442 are thus positioned on an opposite side of the retainer/backing plate 446, and the undercut 444 is loosely positioned within the hole 447 (see FIG. 36). The first retainable fastener 440 is thus axially retained on the retainer/backing plate 446. When axially retained, the first retainable fastener 440 can be rotated within the hole 447 of the retainer/backing plate 446 without causing relative axial movement with the retainer/backing plate 446.

The protective cover 356 preferably includes a pocket 471 that can hold and retain the retainer/backing plate 446 and thereby hold and retain the first retainable fastener 440. As shown at FIGS. 32 and 35-37, the protective cover 356 includes a retaining pocket 474 on one side of the pocket 471 and a resilient keeper 472 on the other side of the pocket 471. The retainer/backing plate 446 includes a first tab $448_1$ and a second tab $448_2$. The first tab $448_1$ can be positioned in the retaining pocket 474 by angling the retainer/backing plate 446 and inserting the first tab $448_1$ into the retaining pocket 474. The retainer/backing plate 446 can then be rotated such that the second tab $448_2$ engages the resilient keeper 472. After rotating the second tab $448_2$ past the resilient keeper 472, the resilient keeper 472 latches onto and retains the second tab $448_2$. The retainer/backing plate 446 and the first retainable fastener 440 are thus retained on the protective cover 356 and remain retained in normal use (e.g., when the protective cover 356 is opened and closed and when the cable anchoring device 320 is installed on a structure). As illustrated at FIG. 37, the retainer/backing plate 446 can distribute the bearing load applied by the head 441 to the pocket 471 of the protective cover 356.

As shown at FIGS. 36 and 37, the second retainable fastener 340 is a female fastener (e.g., a nut). The second retainable fastener 340 includes a threaded hole 342 compatible with the threads 442 of the first retainable fastener 440. The second retainable fastener 340 includes one or more anti-rotational features 344 (e.g., flats) that engage a pocket 345 (see FIG. 36) positioned within the clamp base 336 of the main cable securing component 350. The second retainable fastener 340 is preferably retained by the pocket 345 and remains retained in normal use (e.g., when the protective cover 356 is opened and closed and when the cable anchoring device 320 is installed on a structure). Alternatively, threads, compatible with the threads 442 of the first retainable fastener 440, can be molded or cut directly into the clamp base 336 or elsewhere on the main cable securing component 350.

The aforementioned retained components provide ease of use to the cable anchoring device 320. By having the combined clamping and fastening system, the protective cover 356, and the main cable securing component 350 all held together, no pieces will fall off when storing, shipping, deploying, installing, servicing, and uninstalling the cable anchoring device 320. This benefit is especially valuable when the cable anchoring device 320 is installed at a substantial height above the ground and when installed in areas that are sensitive to loose parts falling (e.g., over machinery, public gathering areas, etc.)

In addition to the features described above, the protective cover 356 preferably includes a front wall 426 generally extending between side walls 428. The side walls 428 generally conform to the wall 328 of the main cable securing component 350 when the protective cover 356 is closed (see FIG. 32). A pair of stacking retainers 466 (e.g. channels, lips, latches, etc.) can be provided at or near an intersection of the front wall 426 and the side walls 428. A stacking retainer stop 468 can be provided at an end of the stacking retainers 466 (e.g., a bottom end as shown at FIG. 37). An opening 450 can be provided in the front wall 426 of the protective cover 356. The opening 450 can be used to access the mounting fastener 338 when the protective cover 356 is closed.

A protective cover 356' is illustrated at FIGS. 30, 31, and 38-41 that is similar to the protective cover 356. However the protective cover 356' includes a cover opening 450' with two fastener clearance slots 452. The opening 450 of the protective cover 356 includes four of the fastener clearance slots 452. The protective covers 356, 356' can be collectively referred to as the protective cover 356.

In addition to the features described above, the main cable securing component 350 preferably includes stacking lugs 366 (e.g., ears, tabs, fingers, etc.) that extend beyond the wall 328 on opposite sides of the base 332. The stacking lugs 366 include a stacking lug stop 368 (see FIG. 32).

Figure 43:
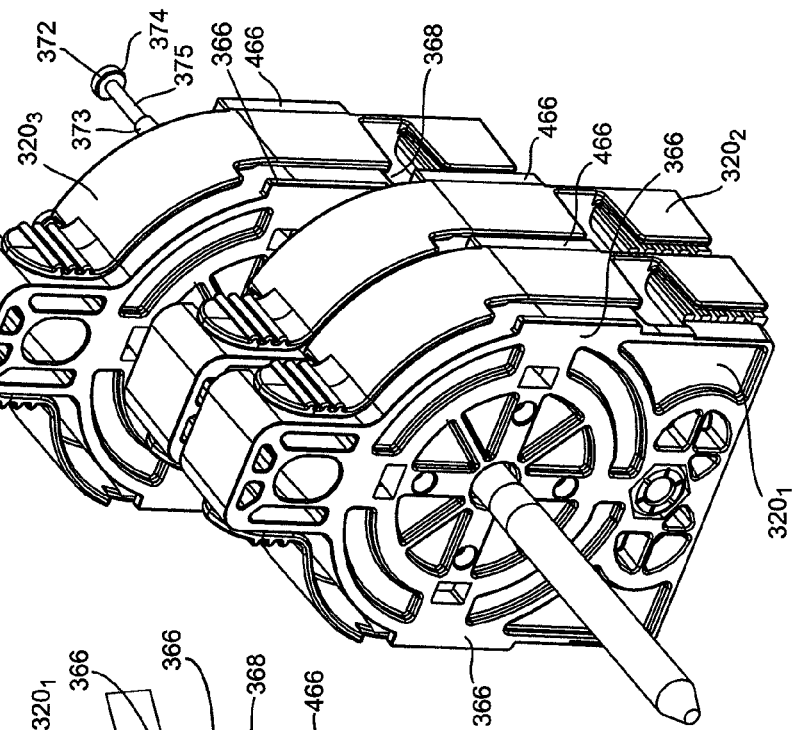
FIG. 43 is another perspective view of the stack of FIG. 42.
Figure 42:
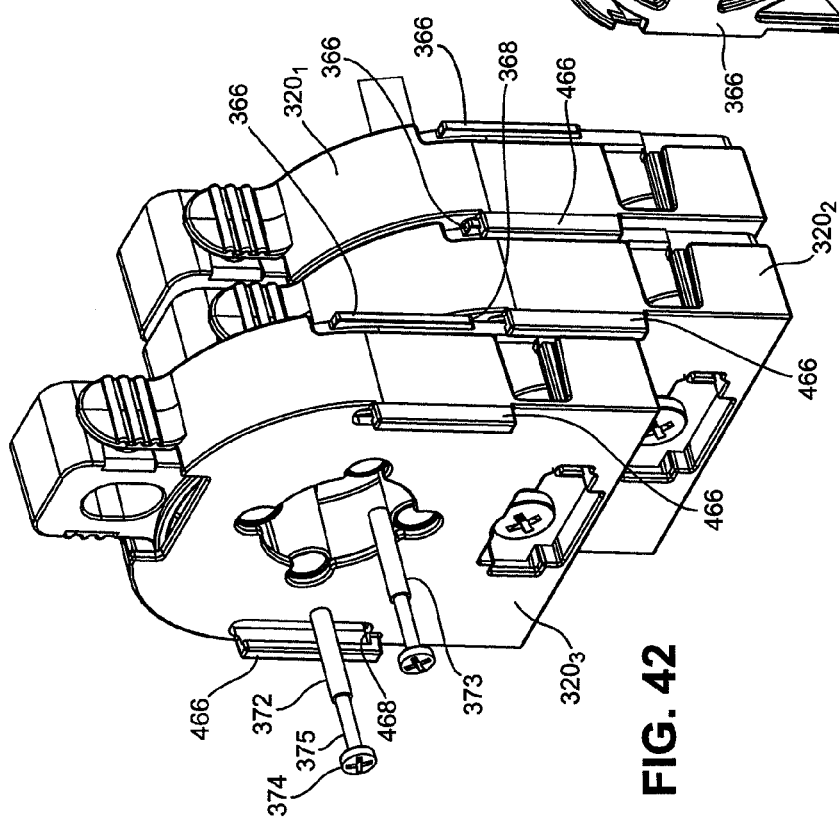
FIG. 42 is a perspective view of a stack of the cable anchoring devices of FIG. 30.
Figure 46:
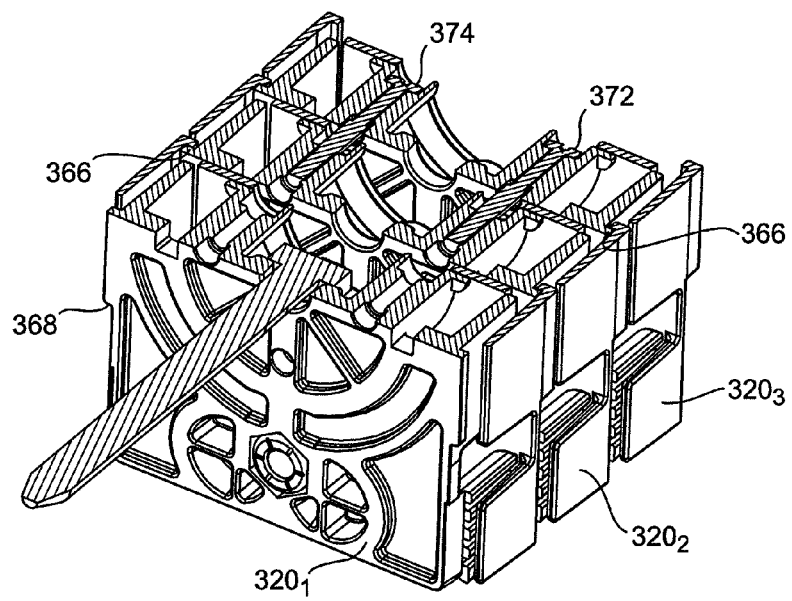
FIG. 46 is a cross-sectional perspective view of a stack of the cable anchoring devices of FIG. 30.
Figure 47:
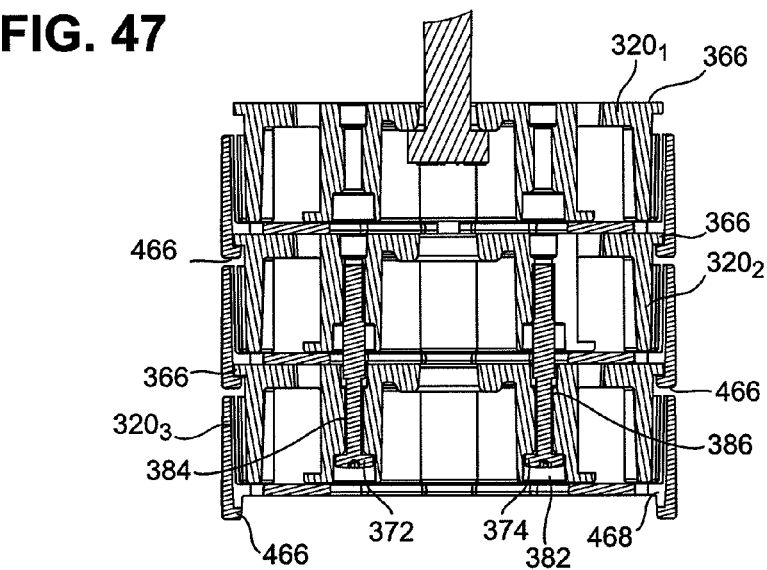
FIG. 47 is a cross-sectional top plan view of the stack of FIG. 46.

The cable anchoring device 320 is preferably configured to stack (i.e. a second cable anchoring device $320_2$ can be mounted on top of a first cable anchoring device $320_1$). Multiple cable anchoring devices 320 can thereby be stacked upon one another to form an anchor for multiple fiber optic cables 24 (see FIGS. 42-47). To stack the second cable anchoring device $320_2$ on the first cable anchoring device $320_1$, the stacking lugs 366 of the second cable anchoring device $320_2$ are aligned with the stacking retainers 466 of the first cable anchoring device $320_1$ (see FIGS. 42 and 43). The stacking lugs 366 are then slid into the stacking retainers 466 until the stacking lug stops 368 engage the stacking retainer stops 468. In the example shown at FIGS. 42-47, the stacking retainers 466 have a female configuration and the stacking lugs 366 have a male configuration (i.e., the stacking retainers 466 receive the stacking lugs 366). In other embodiments, this female-male configuration can be reversed on one or both sides of the cable anchoring device 320.

Figure 34:
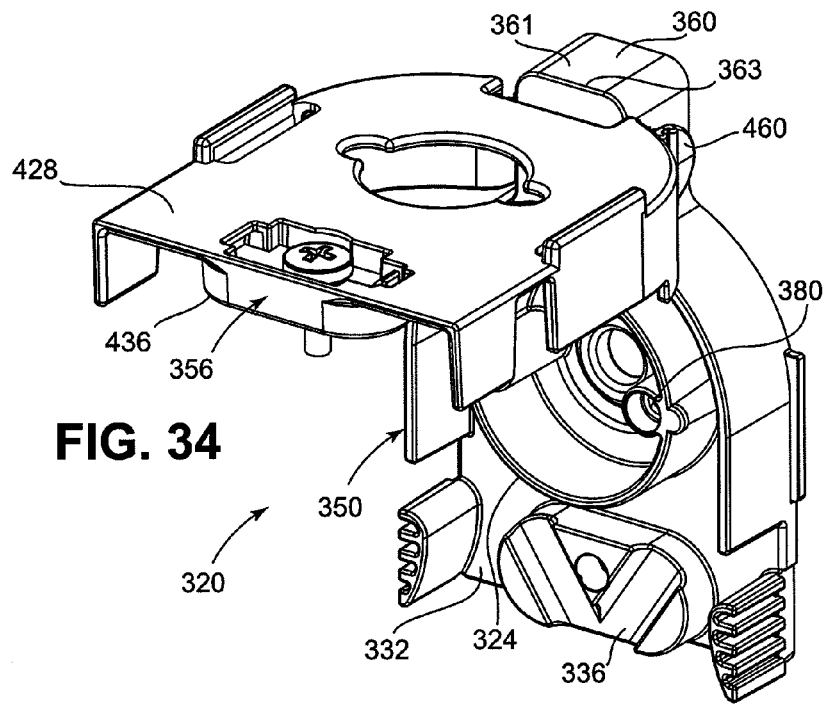
FIG. 34 is another perspective view of the cable anchoring device of FIG. 30 in an open configuration.
Figure 35:
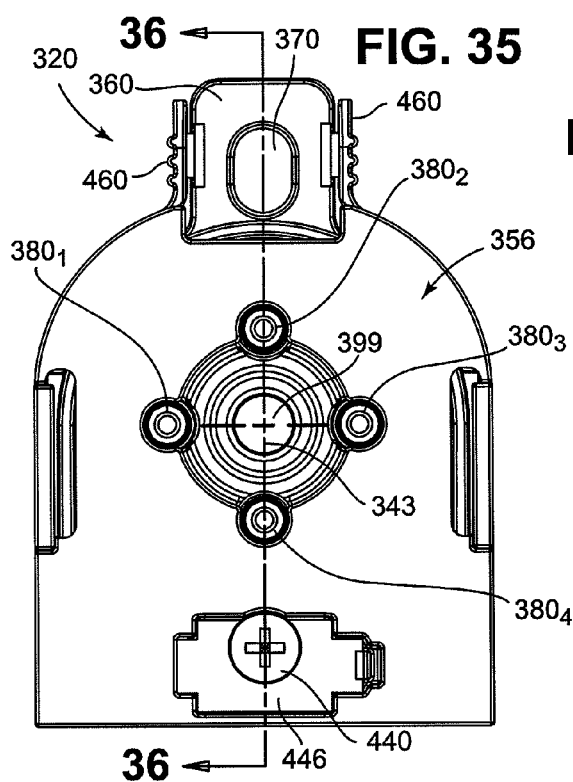
FIG. 35 is a front plan view of the cable anchoring device of FIG. 30 in the closed configuration.

As illustrated at FIGS. 34 and 44, the front wall 426 of the protective cover 356 is approximately co-planar with a top 361 of the lug 360 of the main cable securing component 350. This arrangement allows the protective cover 356 of the first cable anchoring device $320_1$ to be opened even when the second cable anchoring device $320_2$ is stacked on its top (see FIG. 44). The back side 326 of the main cable securing component 350 of the second cable anchoring device $320_2$ can interfere with a corner 363 of the lug 360 of the main cable securing component 350 of the first cable anchoring device $320_1$ while the protective cover 356 is being opened. The pair of tabs 460 and other features of the protective cover 356 are preferably resilient and flexible enough to allow the interference to pass as the protective cover 356 is opened and closed. Once in the open position, as shown at FIGS. 34 and 44, the interference and resilient features keep the protective cover 356 of the first cable anchoring device $320_1$ in the open position.

Figure 48:
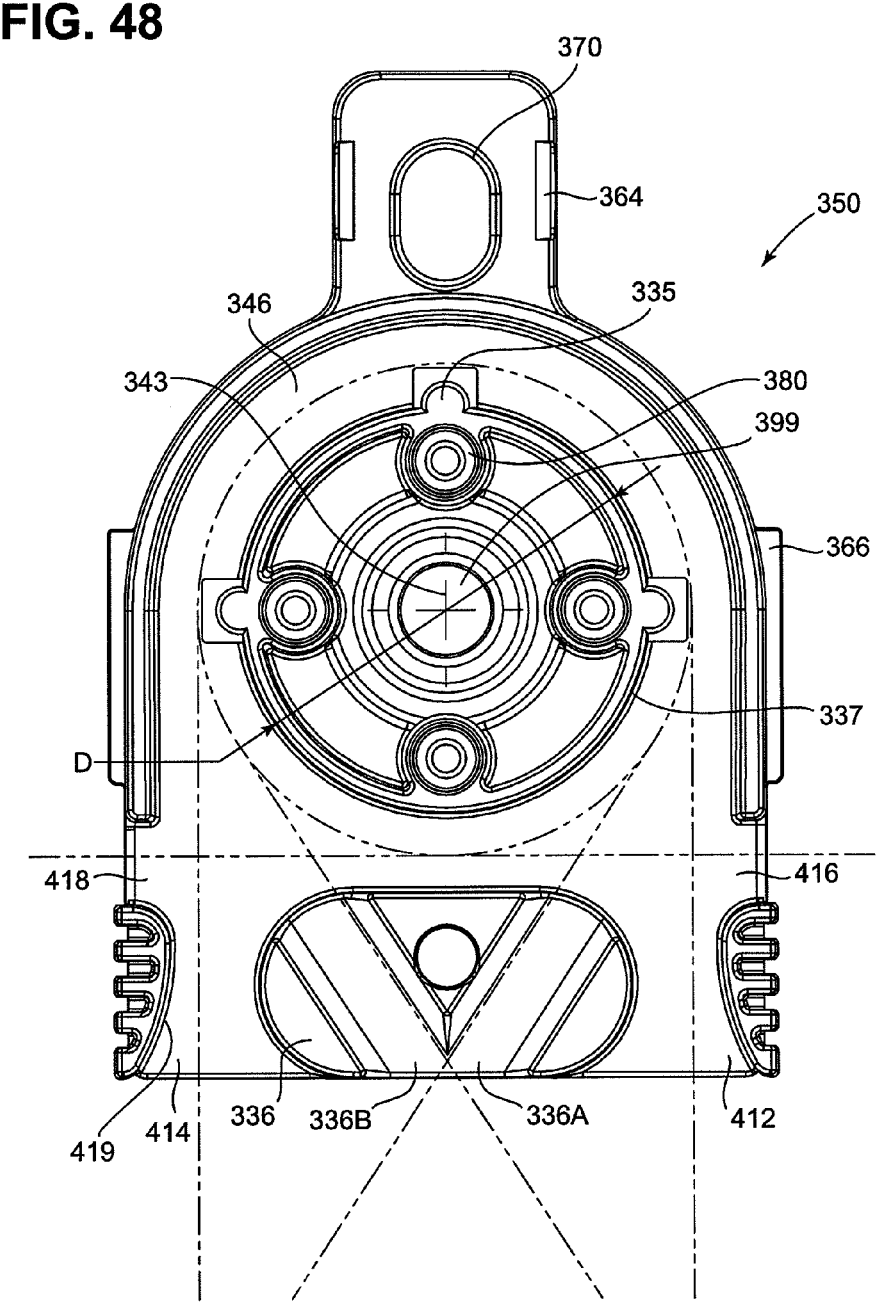
FIG. 48 is a front plan view of a main cable anchoring member of the cable anchoring device of FIG. 30.

A set of stacked cable anchoring devices 320 can preferably be secured together by stacking fasteners 372. In the embodiments illustrated at FIGS. 30-47, stackable fastening holes 380 are provided to allow the second cable anchoring device $320_2$ to be secured by the fasteners 372 to the first cable anchoring device $320_1$. A third cable anchoring device $320_3$ can be secured by the fasteners 372 to the second cable anchoring device $320_2$ and so on. As shown at FIGS. 33 and 48, the stackable fastening holes 380 are provided inside the spooling portion 337 of the spool 334 of the main cable securing component 350. In the embodiment illustrated at FIGS. 32-37 and 42-47, four of the stackable fastening holes 380 are provided and called out individually as stackable fastening holes $380_1$, $380_2$, $380_3$, and $380_4$ at FIG. 35. In the embodiment illustrated at FIGS. 30, 31, and 38-41, two of the stackable fastening holes 380 are provided. The stackable fastening holes 380 can be used to secure the cable anchoring device 320, $320_1$ to a structure (e.g., the building 322, etc.) The stackable fastening holes 380 and suitable fasteners can provide a torque resistant connection between the cable anchoring device 320 and the structure (e.g., the building 322). The stackable fastening holes 380 and the fasteners 372 can provide a torque resistant connection between stacked cable anchoring devices 320.

FIGS. 30, 31, and 38-41 illustrate a main cable securing component 350' that is similar to the main cable securing component 350 except that it has two of the stackable fastening holes 380 instead of four, as mentioned in the preceding paragraph. The main cable securing components 350, 350' can be collectively referred to as the main cable securing component 350.

FIGS. 36 and 44-47 further illustrate the stackable fastening hole 380. The stackable fastening hole 380 preferably includes a fastening head pocket 382, opening toward the front end 341 of the spooling portion 337; a relief portion 386, with no engaging internal threads adjacent the back side 326 of the main cable securing component 350; and a threaded portion 384 between the fastening head pocket 382 and the relief portion 386. By using the stackable fasteners 372, similar to the first retainable fastener 440 described above, the second cable anchoring device $320_2$ can be fastened to the top of the first cable anchoring device $320_1$. In particular, a threaded portion 373 of the stackable fastener 372 is inserted through the fastening head pocket 382 and threaded through the threaded portion 384. Upon a head 374 of the stackable fastener 372 occupying the fastening head pocket 382, an undercut 375 of the stackable fastener 372 is positioned within the threaded portion 384, and the threaded portion 373 of the stackable fastener 372 is in the relief portion 386 and/or beyond the back side 326 of the main cable securing component 350. With the stackable fastener 372 so positioned in one of the stackable fastening holes 380 of the second cable anchoring device $320_2$, the threaded portion 373 of the stackable fastener 372 can engage the threaded portion 384 of one of the stackable fastening holes 380 of the first cable anchoring device $320_1$. It is preferred that the stackable fastener 372 fill the same position in both the first and the second cable anchoring device $320_1$, $320_2$. For example, if the stackable fastener 372 is installed in the stackable fastening hole $380_3$ in the second cable anchoring device $320_2$, then the same stackable fastener 372 should be threaded into the stackable fastening hole $380_3$ in the first cable anchoring device $320_1$.

When more than two of the cable anchoring devices 320 are stacked together, alternate hole positions are preferably used from one joint to the next. For example, if the stackable fastening holes $380_1$ and $380_3$ (i.e., odd holes) are used to join the first and the second cable anchoring devices $320_1$, $320_2$, then the stackable fastening holes $380_2$ and $380_4$ (i.e., even holes) are used to join the second and the third cable anchoring devices $320_2$, $320_3$. By alternating from the odd holes to the even holes, the stacking of the cable anchoring devices 320 can be continued to four or more cable anchoring devices 320.

By placing the fiber optic cable 24 in one of the cable clamping slots 336A, 336B while the protective cover 356 is either removed (see FIGS. 39 and 40) or in an open position (see FIGS. 38 and 41) and then installing and/or closing the protective cover and engaging the retainable fastener 440, the fiber optic cable 24 is effectively clamped between the clamp base 336 and the protective cover 356 (in cooperation with the retainer/backing plate 446).

Once the fiber optic cable 24 has been routed multiple wraps around the spool 334 and positioned within one of the cable clamping slots 336A, 336B, the protective cover 356 can be closed over the main cable securing component 350. The protective cover 356 includes a front face plate 456 that substantially covers the front end 341 of the spooling portion 337 of the main cable securing component 350, and the side walls 428 form a partially circumferential shroud that extends rearwardly from the front face plate 456 and circumferentially surrounds a portion of the spooling portion 337.

As described above with respect to the spooling portion 238, it is preferred for the spooling portion 337 to define a diameter D of at least 2 inches (see FIG. 48). Likewise, it is also preferred for the spooling portion 337 to have an axial length L that is equal to or greater than 2 or 3 times the outer diameter of a fiber optic cable 24 intended to be wrapped around the spooling portion 337 (see FIG. 36).

In use of the cable anchoring device 320, the protective cover 356 is removed and/or opened from the main cable securing component 350 and the main cable securing component 350 is secured to a structure by fasteners (e.g., the fastener 338) that are inserted through the fastener opening 399 (see FIG. 31). As so mounted, the clamp base 336 is preferably positioned along the direction 307 of the tensile load of the fiber optic cable 24 relative to the spooling portion 337. The protective cover 356 is opened and/or removed. Thereafter, a fiber optic cable 24 is wrapped at least two times and preferably two and a half times around the spooling portion 337 starting at the nine o'clock position and ending at the three o'clock position (see FIG. 39). Preferably, the fiber optic cable 24 is routed so that a tensile load carrying portion (e.g., the second portion $303_2$ of the cable route 303 at FIGS. 30 and 39) initially engages the spool at the nine o'clock position and is wrapped in a forward clockwise spiral about the spooling portion 337 for two and a half wraps starting adjacent the back end 339 of the spooling portion 337 and ending adjacent the front end 341 of the spooling portion 337. After the cable 24 has been wrapped two and half times around the spooling portion 337 from the nine o'clock position to the three o'clock position, the forward portion of the wrap is tangentially routed through the cable clamping slot 336A that is generally tangent to the three o'clock position of the spooling portion 337. If the fiber optic cable 24 were initially routed vertically up against the three o'clock position of the spooling portion 337, the cable would be wrapped two and a half times in a counterclockwise direction to the nine o'clock position and then routed tangentially through the other cable clamping slot 336B (see FIG. 40).

FIG. 48 illustrates cable pathways 412, 414, 416, and 418 that provide tangential access to the spooling portion 337 for the fiber optic cable 24. The cable pathway 412 provides tangential access to the three o'clock position. The cable pathway 414 provides tangential access to the nine o'clock position. The cable pathway 416 provides tangential access to the six o'clock position with the fiber optic cable 24 entering at the right. The cable pathway 418 provides tangential access to the six o'clock position with the fiber optic cable 24 entering at the left. Any of these pathways can be used depending on the configuration of the installation.

Once the fiber optic cable 24 is routed through the cable clamping slot 336A, the protective cover 356 is closed and the retainer/backing plate 446 is engaged through the protective cover 356 to the clamp base 336 with the fiber optic cable 24 thereinbetween. The clamping surface 436 of the protective cover 356 and a bottom of the cable clamping slot 336A, 336B of the clamp base 336 are brought together around the fiber optic cable 24 to a distance Dc by tightening the retainable fastener 440 into fastener 442 (see FIG. 36) to complete the installation process.

The clamping surface 436 of the protective cover 356, the clamping slots 336A, 336B of the clamp base 336, and the spooling portion 337 can include a textured surface (e.g., knurling, bumps, projections, ridges, grooves, or other structures) adapted for increasing friction between these surfaces and the fiber optic cable 24. The spooling portion 337 preferably has a diameter D of at least one inch and more preferably has a diameter D of at least one and one-quarter inches.

Clamps in accordance with the present disclosure are adapted to limit slipping of fiber optic cable and internal strength members (e.g., Kevlar) provided within a jacket of the cable. The various embodiments disclosed herein use a mandrel wrap system that distributes load through a plurality of wraps of cable. In a preferred embodiment, at least two wraps are utilized by the mandrel wrap system. The fiber optic cable is then further secured (e.g., gripped, clamped, engaged) with a further engaging element (e.g., a clamping mechanism) to limit slipping that may occur during extreme temperatures, large loads applied to the vertical portion of the cable, or loads applied over extended periods of time.

From the forgoing detailed description, it will be evident that modifications and variations can be made without departing from the spirit and scope of the disclosure.

What is claimed is:

1. A fiber optic cable anchoring device for anchoring a fiber optic cable, the fiber optic cable anchoring device comprising:
   an anchoring arrangement adapted for connection to a structure, the anchoring arrangement including:
      a spool about which a portion of the fiber optic cable can be wrapped at least two times;
      a clamp for clamping the fiber optic cable to limit slipping of the fiber optic cable relative to the spool, the clamp including non-parallel cable receiving slots that are angled relative to one another and are aligned along lines generally tangent to the spool; and
      a base that carries the spool and at least a portion of the clamp.

2. The fiber optic cable anchoring device of claim 1, wherein the spool is located directly above the clamp when the anchoring arrangement is mounted at the structure.

3. The fiber optic cable anchoring device of claim 1, wherein the non-parallel cable receiving slots of the clamp include a first cable receiving slot and a second cable receiving slot.

4. The fiber optic cable anchoring device of claim 3, wherein the clamp includes a clamping fastener positioned between the first cable receiving slot and the second cable receiving slot.

5. The fiber optic cable anchoring device of claim 1, wherein the clamp includes at least one of the cable receiving slots on the base, the at least one of the cable receiving slots aligned along one of the lines generally tangent to the spool.

6. The fiber optic cable anchoring device of claim 1, wherein the clamp includes a clamp base joined to the base and spaced from the spool, wherein the clamp includes a clamping member moveable relative to the clamp base, and wherein a clamped portion of the fiber optic cable is positioned between the clamping member and the clamp base when the fiber optic cable is anchored to the fiber optic cable anchoring device.

7. The fiber optic cable anchoring device of claim 1, further comprising a cover adapted to substantially cover the portion of the fiber optic cable wrapped on the spool when the fiber optic cable is anchored to the fiber optic cable anchoring device.

8. The fiber optic cable anchoring device of claim 7, wherein the base of the anchoring arrangement mounts the spool and the clamp and rotatably mounts the cover.

9. The fiber optic cable anchoring device of claim 7, wherein the base of the anchoring arrangement carries a first portion of the clamp, wherein the cover of the fiber optic cable anchoring device is pivotally connected to the base, and wherein a second portion of the clamp is carried by the cover.

10. The fiber optic cable anchoring device of claim 9, wherein the clamp includes a first fastener component coupled to the first portion of the clamp and a second fastener component coupled to the second portion of the clamp.

11. The fiber optic cable anchoring device of claim 10, wherein the base, the first portion of the clamp, and the spool are a unitary piece.

12. A fiber optic cable anchoring device for anchoring a fiber optic cable, the fiber optic cable anchoring device comprising:
   an anchoring arrangement adapted for connection to a structure, the anchoring arrangement including:
      a spool about which a portion of the fiber optic cable can be wrapped at least two times;
      a clamp for clamping the fiber optic cable to limit slipping of the fiber optic cable relative to the spool; and
      a base that carries the spool and a portion of the clamp;
   wherein the clamp includes a clamp base joined to the base and spaced from the spool, wherein the clamp includes a clamping member moveable relative to the clamp base, and wherein a clamped portion of the fiber optic cable is positioned between the clamping member and the clamp base when the fiber optic cable is anchored to the fiber optic cable anchoring device; and
   wherein the clamping member is provided on a cover that mounts to the base and covers at least a portion of the spool when the fiber optic cable is anchored to the fiber optic cable anchoring device.

13. The fiber optic cable anchoring device of claim 12, wherein the cover is adapted to substantially cover the portion of the fiber optic cable wrapped on the spool when the fiber optic cable is anchored to the fiber optic cable anchoring device.

14. The fiber optic cable anchoring device of claim 13, wherein the anchoring arrangement defines at least one cable pathway providing access to the spool for the fiber optic cable, wherein the at least one cable pathway is aligned along a line generally tangent to the spool.

15. A fiber optic cable anchoring device for anchoring fiber optic cables, the fiber optic cable anchoring device comprising:
   a first and a second anchoring arrangement adapted for connection to a structure, the anchoring arrangements each including:
      a spool about which a portion of one of the fiber optic cables can be wrapped at least two times;
      a clamp for clamping the one of the fiber optic cables to limit slipping of the one of the fiber optic cables relative to the spool;
      fastening holes arranged in an even set and an odd set, the even set including at least one of the fastening holes and the odd set including at least one of the fastening holes; and
      a first set of one or more fasteners;
   wherein the first set of the one or more of the fasteners fastens the second anchoring arrangement to the first anchoring arrangement via the odd set of the fastening holes of the first and the second anchoring arrangements; and
   wherein the even set of the fastening holes of at least the second anchoring arrangement can receive a second set of one or more of the fasteners for use in fastening a third anchoring arrangement via an even set of fastening holes of the third anchoring arrangement.

16. The fiber optic cable anchoring device of claim 15, wherein the first and second anchoring arrangements each include first and second interconnecting members and wherein the first interconnecting member of the first anchoring arrangement is adapted to engage the second interconnecting member of the second anchoring arrangement such that the first and the second anchoring arrangements are connectable to each other when stacked upon one another.

17. The fiber optic cable anchoring device of claim 16, further comprising the third anchoring arrangement that also includes first and second interconnecting members, wherein the first interconnecting member of the second anchoring arrangement is adapted to engage the second interconnecting member of the third anchoring arrangement such that the second and the third anchoring arrangements are connectable to each other when stacked upon one another.

18. The fiber optic cable anchoring device of claim 17, further comprising the second set of the one or more of the fasteners, the first set of the one or more of the fasteners can fasten the first and the second anchoring arrangements together when they are stacked upon one another and the second set of the one or more of the fasteners can fasten the second and the third anchoring arrangements together when they are stacked upon one another, wherein when the first, the second, and the third anchoring arrangements are stacked and fastened to each other the first set of the one or more of the fasteners is positioned within the odd set of the fastening holes of the first and the second anchoring arrangements and the second set of the one or more of the fasteners is positioned within the even set of the one or more of the fastening holes of the second and the third anchoring arrangements.

19. The fiber optic cable anchoring device of claim 16, wherein the first interconnecting member is included on a cover of the anchoring arrangements and the second interconnecting member is included on a base of the anchoring arrangements.

20. A method for anchoring a fiber optic cable to a structure with an anchoring device, the structure selected from the group consisting of a building, a pole, and a wall, the anchoring device including a base, a spool fixed to the base, and a first clamp element fixed to the base and spaced from the spool, the method comprising:
wrapping the fiber optic cable a plurality of times about the spool to form a spooled portion of the fiber optic cable;
securing the spool to the structure by fastening the base of the anchoring device to the structure; and
clamping an unspooled portion of the fiber optic cable between the first clamp element and a second clamp element to resist slipping of the spooled portion of the fiber optic cable relative to the spool when a tensile load is applied to a segment of the fiber optic cable anchored by the anchoring device;
wherein at least a portion of the tensile load applied to the segment is transferred to the spool from the spooled portion of the fiber optic cable.

21. The method of claim 20, wherein the spool, the base, and the first clamp element are a unitary piece.

22. The method of claim 20, wherein the spooled portion of the fiber optic cable is positioned along the fiber optic cable between the clamped unspooled portion of the fiber optic cable and the segment of the fiber optic cable on which the tensile load is applied.

23. A fiber optic cable anchoring device for anchoring a fiber optic cable to a structure, the fiber optic cable anchoring device comprising:
a base piece extending from a first end to a second end, the base piece including:
a mounting surface positioned between the first and the second ends of the base piece, the mounting surface adapted to mount the fiber optic cable anchoring device to the structure and the mounting surface including a fastener hole for receiving a fastener that is adapted to fasten the fiber optic cable anchoring device to the structure;
a fixed spool about which a wrapped portion of the fiber optic cable can be wrapped at least two times when the fiber optic cable is anchored to the fiber optic cable anchoring device, the fixed spool fixedly attached to and extending away from the mounting surface;
a clamp base positioned between the first end of the base piece and the fixed spool, the clamp base spaced from the fixed spool; and
a cover mount positioned between the second end of the base piece and the fixed spool; and
a cover piece extending from a first end to a second end, the cover piece including:
a cover surface positioned between the first and the second ends of the cover piece;
a clamp element positioned adjacent the first end of the cover piece; and
a mounting element positioned adjacent the second end of the cover piece;
wherein the mounting element of the cover piece is mounted to the cover mount of the base piece;
wherein the clamp base of the base piece and the clamp element of the cover piece cooperate to form a clamp that clamps a clamped portion of the fiber optic cable when the fiber optic cable is anchored to the fiber optic cable anchoring device; and
wherein the cover surface of the cover piece covers at least a portion of the fixed spool when the fiber optic cable is anchored to the fiber optic cable anchoring device.

24. The fiber optic cable anchoring device of claim 23, wherein the clamp formed by the clamp base of the base piece and the clamp element of the cover piece includes a cable receiving slot extending tangent to the fixed spool, the cable receiving slot receiving the clamped portion of the fiber optic cable when the fiber optic cable is anchored to the fiber optic cable anchoring device.

* * * * *